United States Patent
Raether

(10) Patent No.: US 8,171,812 B2
(45) Date of Patent: May 8, 2012

(54) SYSTEMS AND METHODS FOR FACILITATING CONVERSION BETWEEN RECIPROCATING LINEAR MOTION AND ROTATIONAL MOTION

(75) Inventor: Bradley L. Raether, Redmond, OR (US)

(73) Assignee: WaveTech Engines, Inc., Tempe, AZ (US)

( * ) Notice: Subject to any disclaimer, the term of this patent is extended or adjusted under 35 U.S.C. 154(b) by 618 days.

(21) Appl. No.: 12/040,793

(22) Filed: Feb. 29, 2008

(65) Prior Publication Data
US 2008/0141801 A1    Jun. 19, 2008

Related U.S. Application Data

(63) Continuation-in-part of application No. 11/544,817, filed on Oct. 7, 2006, now Pat. No. 7,360,521.

(60) Provisional application No. 60/724,390, filed on Oct. 7, 2005.

(51) Int. Cl.
*F16H 21/00*    (2006.01)
(52) U.S. Cl. .......................................................... 74/25
(58) Field of Classification Search ................ 74/25, 50, 74/55, 56, 57
See application file for complete search history.

(56) References Cited

U.S. PATENT DOCUMENTS

| | | | |
|---|---|---|---|
| 306,096 A | 10/1884 | Olson | |
| 699,013 A | 4/1902 | Rauhoff | |
| 1,232,202 A | 7/1917 | Brown | |
| 1,569,525 A | 1/1926 | Owens | |
| 1,572,068 A | 2/1926 | Gould | |
| 1,613,136 A * | 1/1927 | Schieffelin | 123/63 |
| 1,802,902 A | 4/1931 | Brau | |
| 1,876,506 A | 9/1932 | Lee | |
| 2,262,963 A | 11/1941 | Procissi | |
| 2,301,175 A | 11/1942 | Earnshaw et al. | |
| 2,401,466 A * | 6/1946 | Davis et al. | 123/51 BC |
| 2,473,936 A | 6/1949 | Burrough | |
| 3,385,051 A | 5/1968 | Kelly | |
| 3,388,603 A * | 6/1968 | Clark | 74/57 |
| 3,598,094 A | 8/1971 | Odawara | |
| 3,757,748 A * | 9/1973 | Arney | 123/45 A |
| 3,841,165 A * | 10/1974 | Layfield et al. | 74/56 |

(Continued)

FOREIGN PATENT DOCUMENTS
JP    2007100717    4/2007

OTHER PUBLICATIONS

International Search Report and Written Opinion for Application No. PCT/US2007/080612.

*Primary Examiner* — Vicky Johnson
(74) *Attorney, Agent, or Firm* — Schwabe, Williamson & Wyatt, P.C.

(57) ABSTRACT

Systems for facilitating conversion between reciprocating linear motion and rotational motion include a continuous undulating track circumscribing a circular profile and generally defining a cylindrical volume having a central axis; a reciprocator that is configured to linearly reciprocate along the central axis; a converter coupled to the reciprocator to reciprocate with it, configured to rotate about the central axis, and engaged with the undulating track; and a rotator engaged with the converter and configured to rotate about the central axis with the converter but not to linearly reciprocate along the central axis.

30 Claims, 20 Drawing Sheets

U.S. PATENT DOCUMENTS

| | | |
|---|---|---|
| 3,869,928 A | 3/1975 | Ishii et al. |
| 3,916,866 A | 11/1975 | Rossi |
| 4,180,028 A | 12/1979 | Richter |
| 4,210,063 A | 7/1980 | Grossman |
| 4,648,285 A | 3/1987 | Carson |
| 4,834,033 A * | 5/1989 | Larsen .................. 123/56.8 |
| 4,996,953 A | 3/1991 | Buck |
| 5,161,491 A * | 11/1992 | Graves .................. 123/51 A |
| 5,218,933 A | 6/1993 | Ehrlich |
| 5,442,913 A | 8/1995 | Cho et al. |
| 5,467,684 A | 11/1995 | Sher |
| 5,533,335 A | 7/1996 | Shin |
| 5,592,866 A | 1/1997 | Sher |
| 5,762,480 A | 6/1998 | Adahan |
| 5,806,404 A | 9/1998 | Sher |
| 5,894,820 A | 4/1999 | Baeta |
| 5,938,224 A | 8/1999 | Brackett |
| 6,510,831 B2 | 1/2003 | Wiseman |
| 6,629,589 B2 | 10/2003 | Inoue |
| 6,701,709 B2 | 3/2004 | Isaac, Jr. et al. |
| 6,779,494 B1 * | 8/2004 | Aswani .................. 123/56.1 |
| 6,837,141 B1 | 1/2005 | Edelson |
| 6,889,795 B2 | 5/2005 | Shibata et al. |
| 6,892,538 B2 | 5/2005 | Park |
| 7,124,716 B2 | 10/2006 | Novotny |
| 7,152,556 B2 | 12/2006 | Goltsman |
| 7,155,830 B2 | 1/2007 | Sasaki et al. |
| 7,219,631 B1 | 5/2007 | O'Neill |
| 7,360,521 B2 * | 4/2008 | Raether .................. 123/197.1 |
| 2002/0056601 A1 | 5/2002 | Inoue |
| 2003/0056611 A1 | 3/2003 | Moreno-Aparicio |
| 2003/0089109 A1 | 5/2003 | Park |
| 2004/0094352 A1 | 5/2004 | Shibata et al. |
| 2004/0149122 A1 | 8/2004 | Vaughan et al. |
| 2006/0005649 A1 | 1/2006 | Baldascini et al. |
| 2007/0137614 A1 | 6/2007 | Tsuzuki |
| 2008/0006237 A1 * | 1/2008 | Page .................. 123/241 |

* cited by examiner

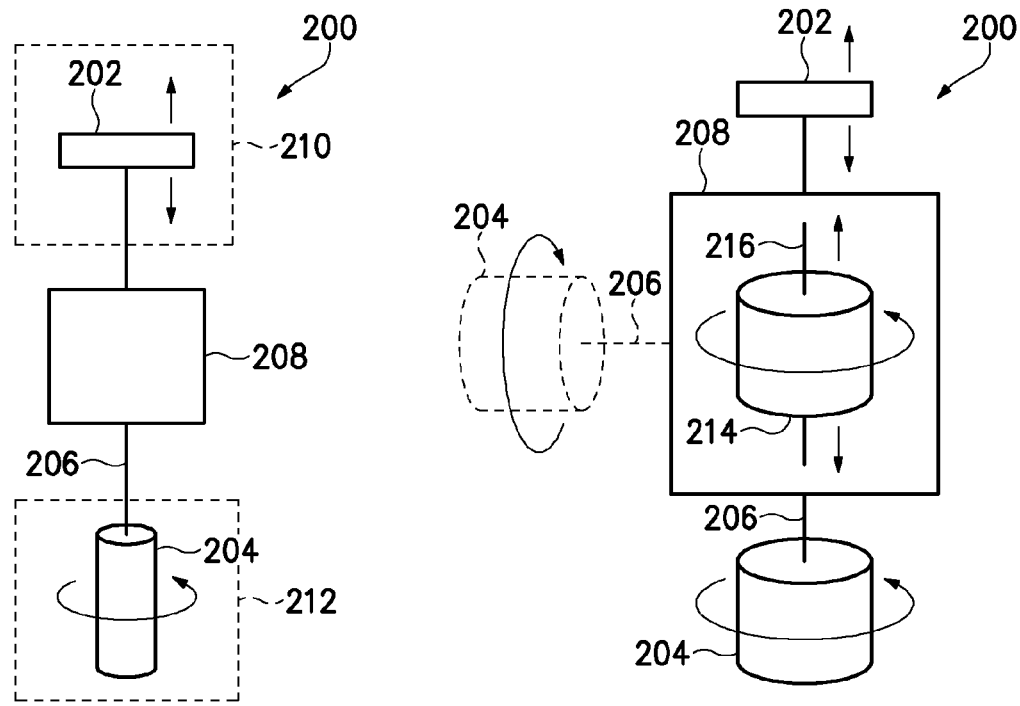
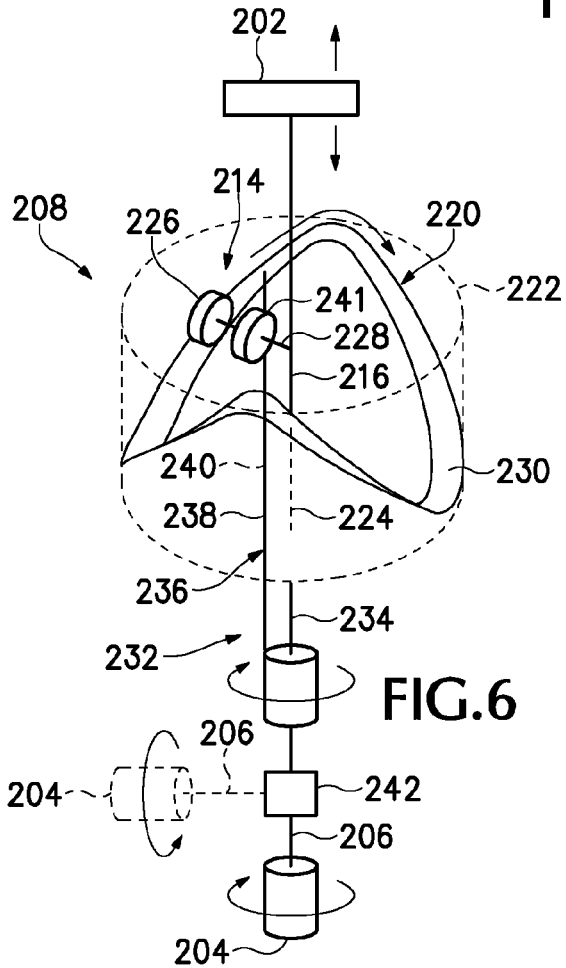
FIG.4    FIG.5    FIG.6

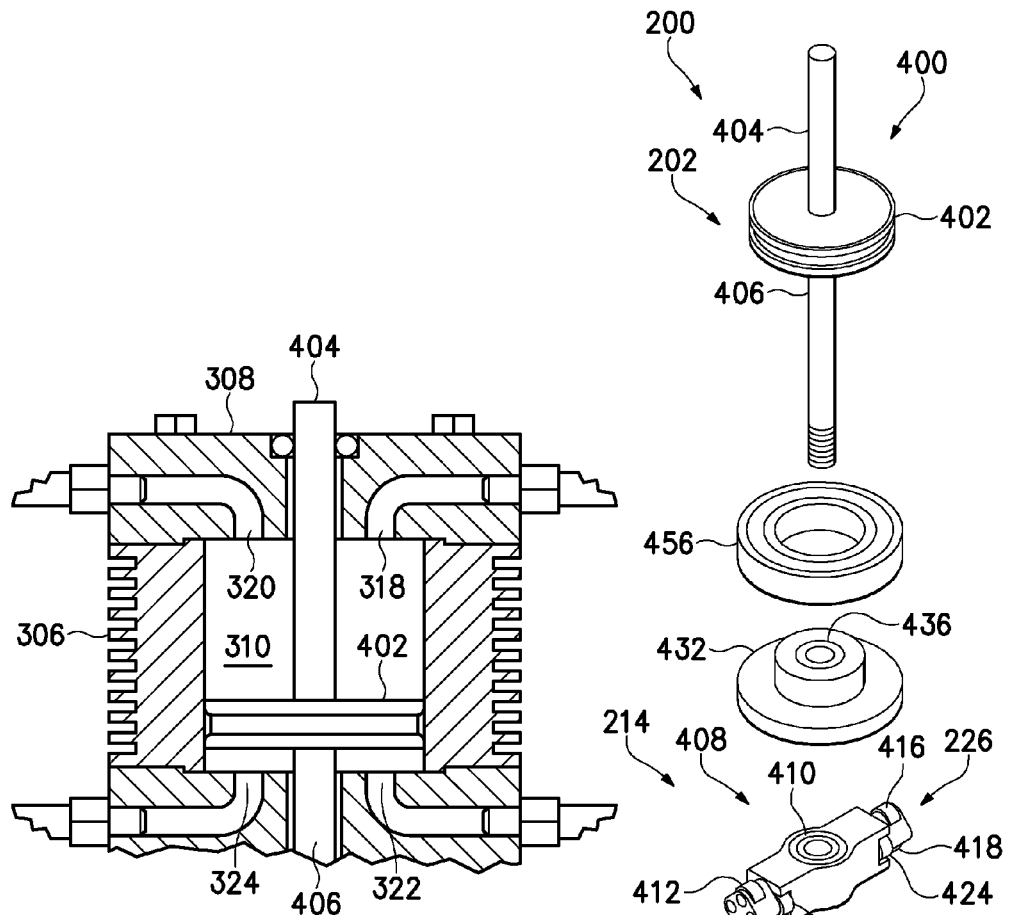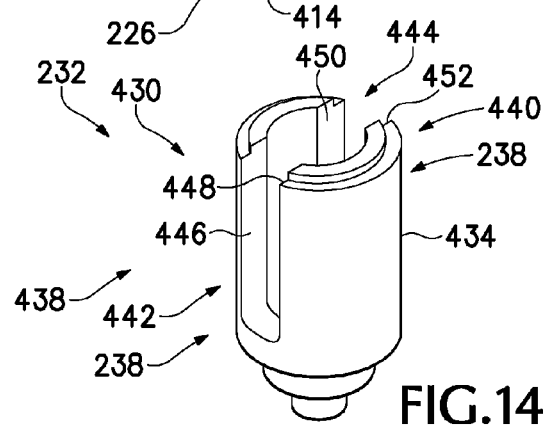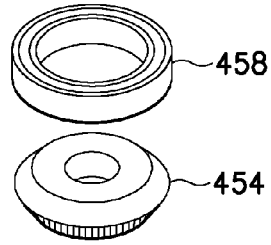

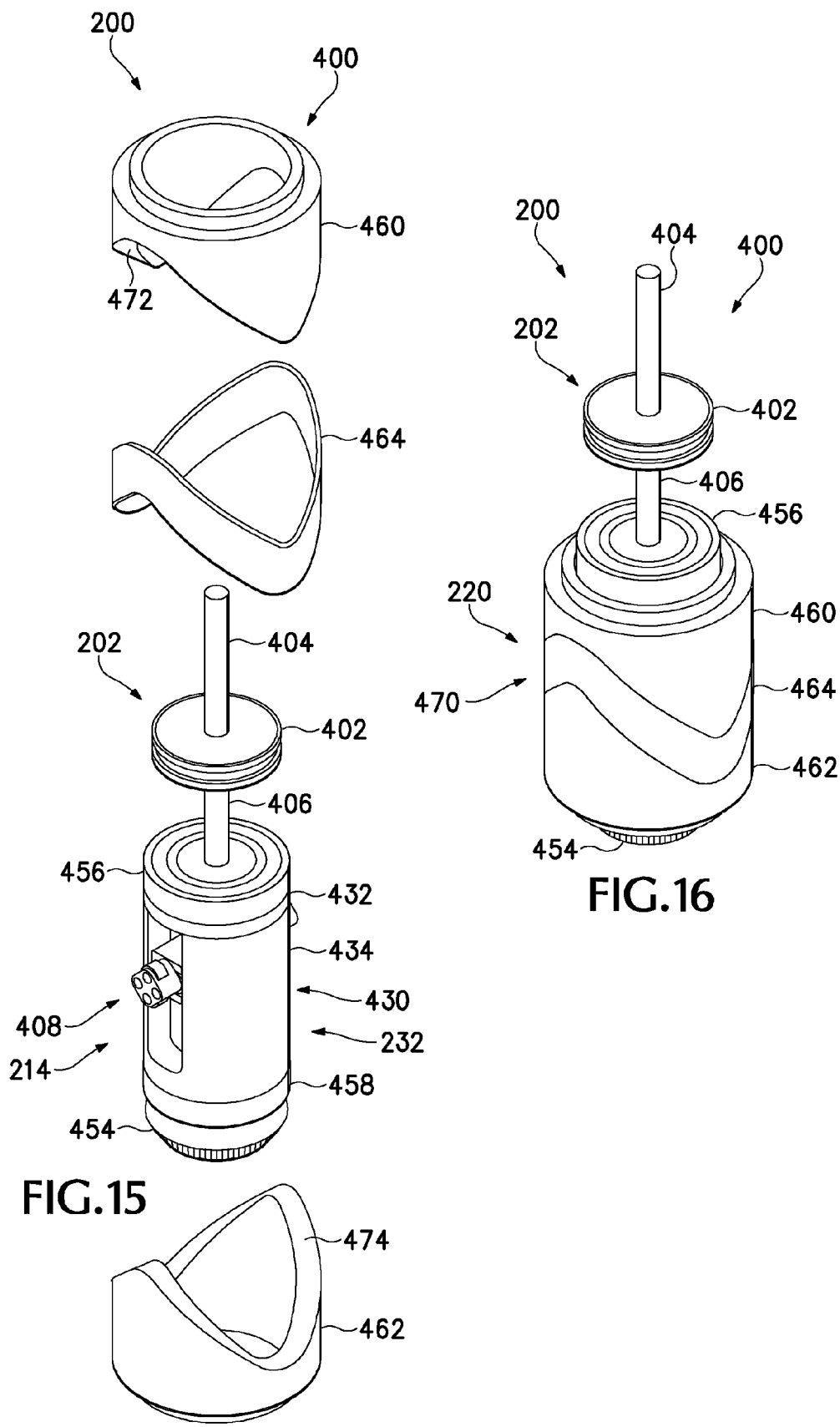

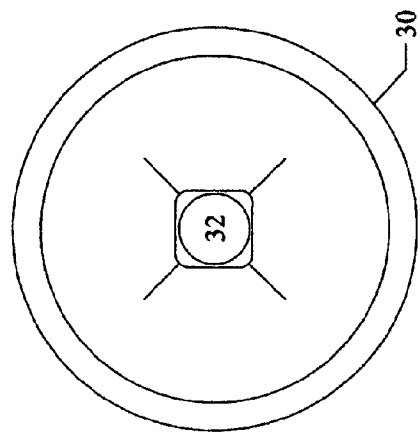
FIG. 19
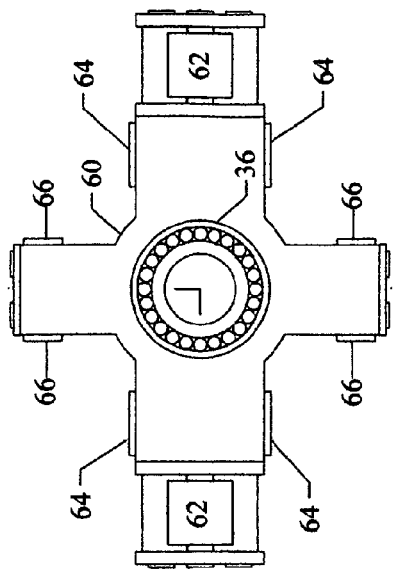
FIG. 20
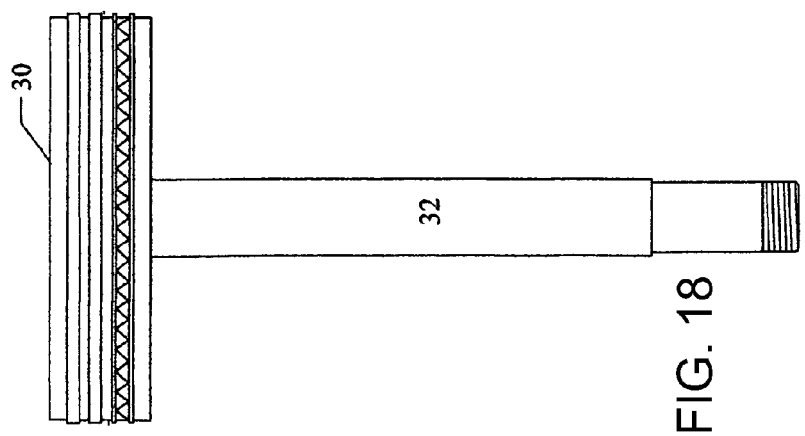
FIG. 18
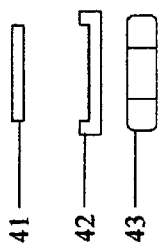

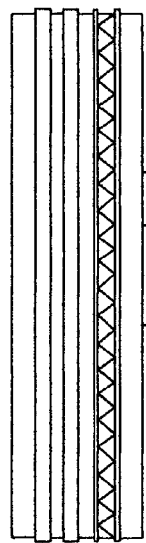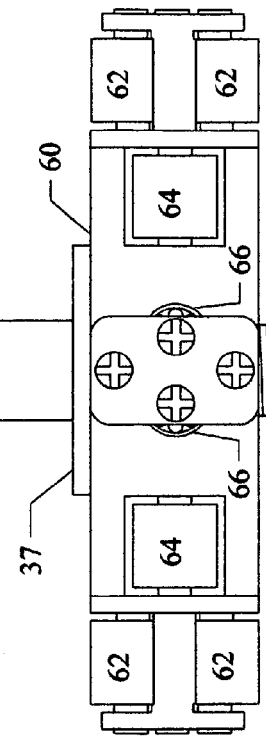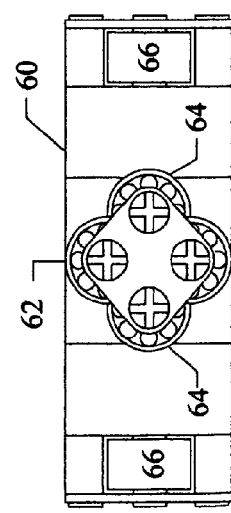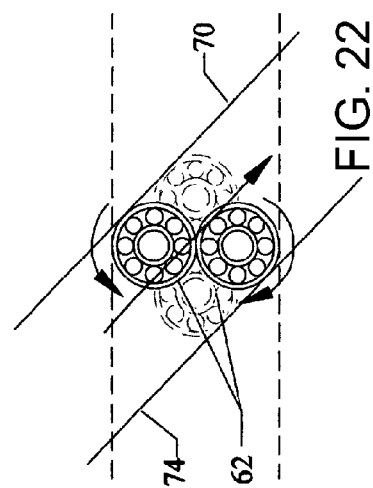

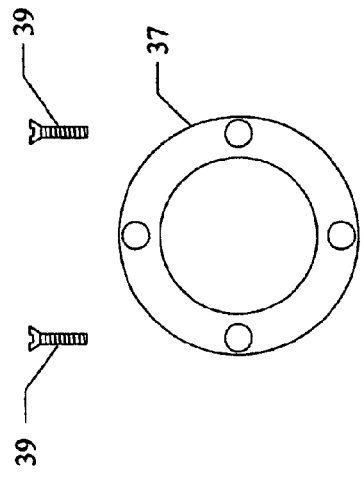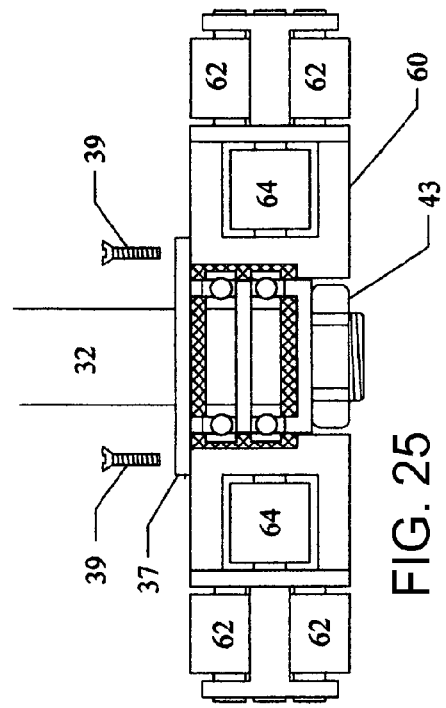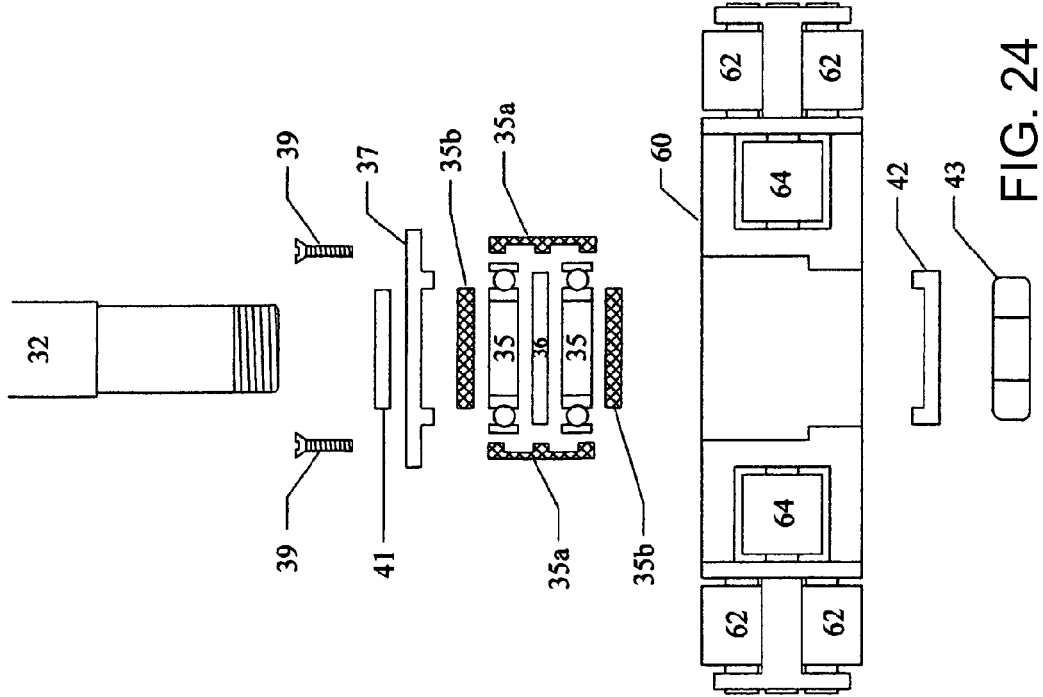

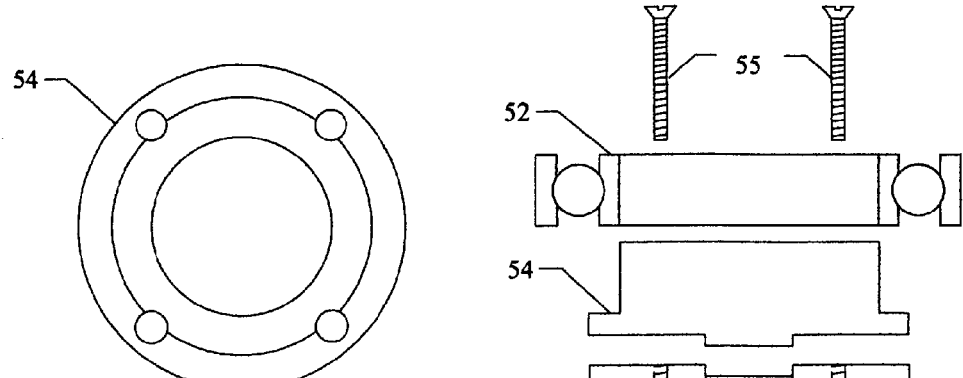
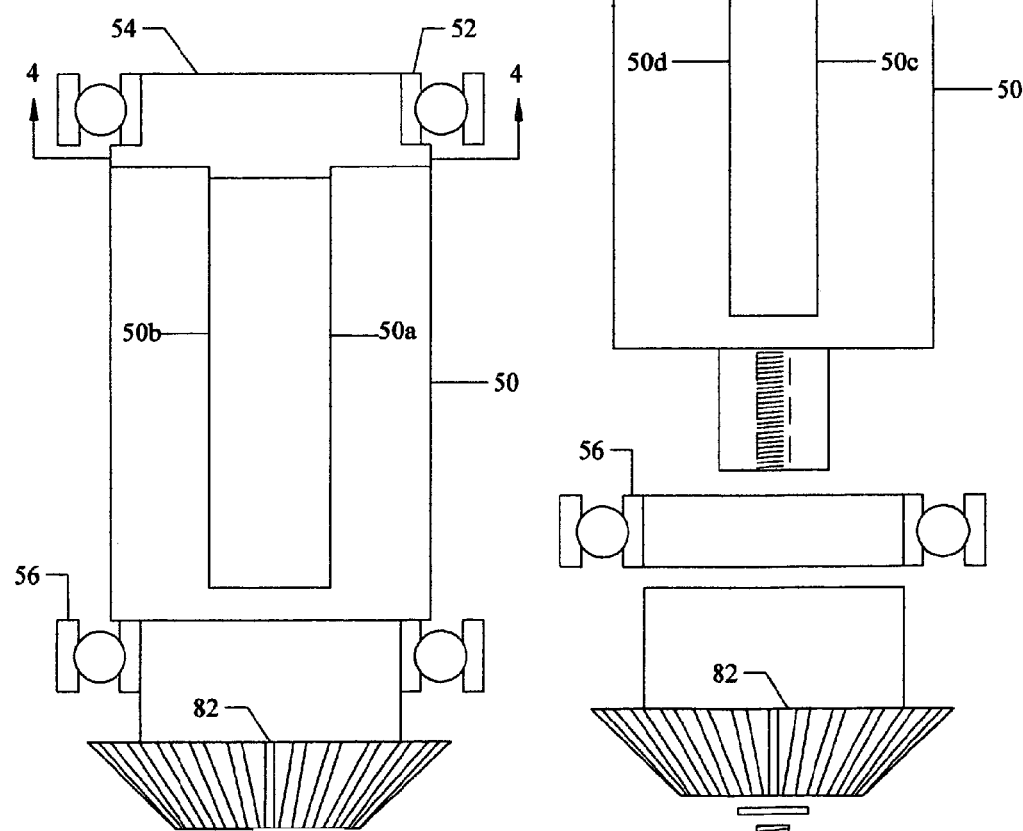
FIG. 28
FIG. 27
FIG. 29

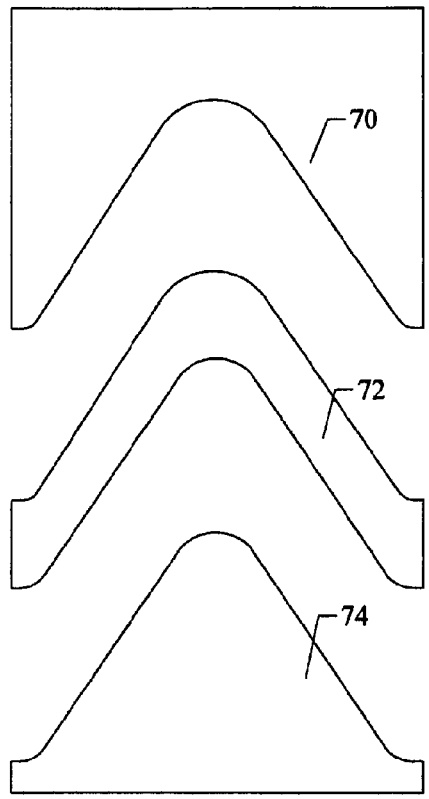
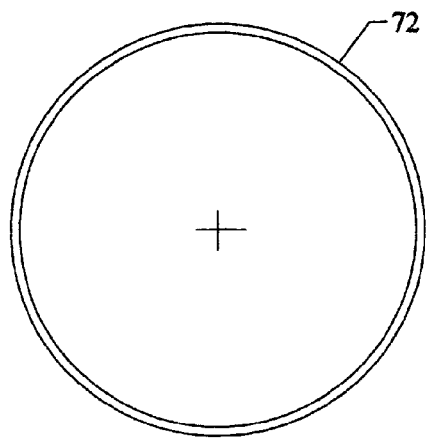
FIG. 40
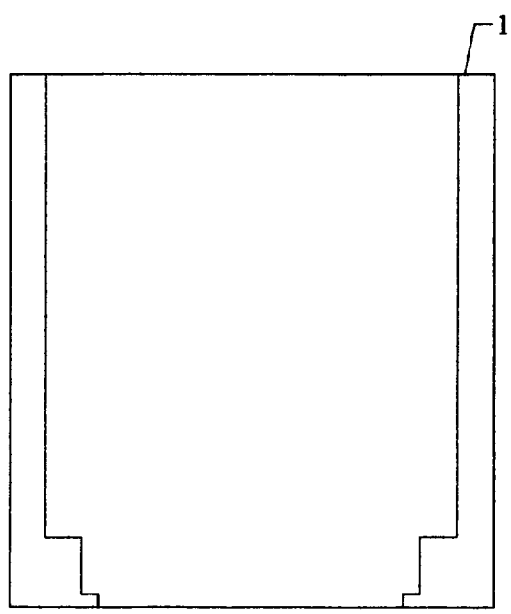
FIG. 38
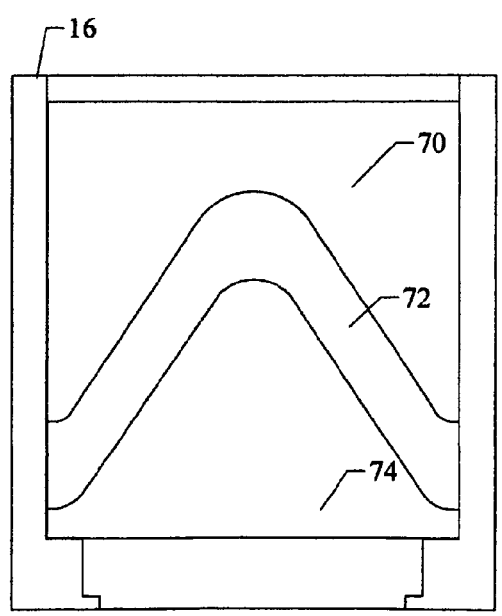
FIG. 39

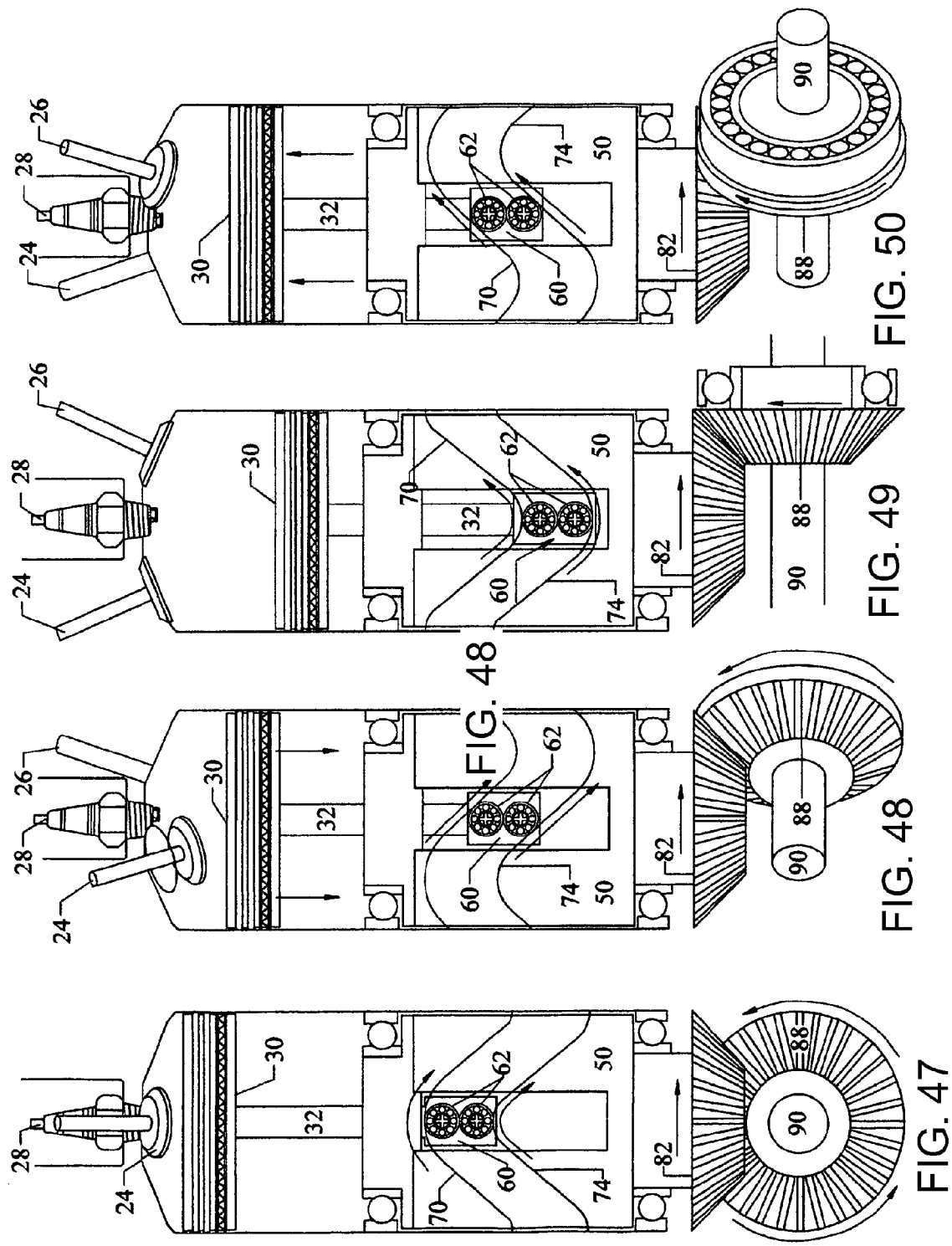

SYSTEMS AND METHODS FOR FACILITATING CONVERSION BETWEEN RECIPROCATING LINEAR MOTION AND ROTATIONAL MOTION

RELATED APPLICATIONS

This application is a continuation-in-part of, and claims priority under 35 U.S.C. §120 to, U.S. patent application Ser. No. 11/544,817, entitled "RECIPROCATING ENGINES," filed on Oct. 7, 2006, the entire content of which is hereby incorporated by reference for all purposes. U.S. patent application Ser. No. 11/544,817 claims priority under 35 U.S.C. §119(e) to U.S. Provisional Application Ser. No. 60/724,390, the entire content of which is hereby incorporated by reference.

BACKGROUND

The present disclosure relates to systems and methods for facilitating conversion between reciprocating linear motion and rotational motion.

It may be desirable to convert reciprocating linear motion to rotational motion, or vice versa, for a variety of reasons. For example, reciprocating engines have long been used to harness the force of combusted fuel, compressed air, steam, or other working fluid within a volume to linearly displace a piston. The desired output, however, is often rotational motion, for example, to turn the wheels of a vehicle, to turn portions of an electrical generator to produce electricity, etc. Conversely, pumps and compressors have long been used to harness the rotational motion of a motor to linearly displace a working fluid. Other mechanical and/or electro-mechanical systems may incorporate systems for facilitating conversion between reciprocating linear motion and rotational motion. A common mechanism for conversion between reciprocating linear motion to rotational motion has long been a connecting rod coupled to a crank arm of a crankshaft.

SUMMARY

A non-exclusive example of a system according to the present disclosure for facilitating conversion between reciprocating linear motion and rotational motion includes a continuous undulating track circumscribing a circular profile and generally defining a cylindrical volume having a central axis; a reciprocator configured to linearly reciprocate along the central axis; a converter coupled to the reciprocator to reciprocate with it, configured to rotate about the central axis, and engaged with the undulating track; and a rotating element engaged with the converter and configured to rotate about the central axis with the converter but not to linearly reciprocate along the central axis. In some embodiments, a system may further include a second rotating element coupled to the first rotating element and configured to rotate about a second axis that is transverse to the central axis.

A non-exclusive example of a method according to the present disclosure for converting reciprocating linear motion to rotational motion includes harnessing a reciprocating linear motion; translating the reciprocating linear motion into a first rotational motion about a first axis that is parallel to the reciprocating linear motion; and translating the first rotational motion into a second rotational motion about a second axis that is transverse to the first axis.

A non-exclusive example of a method according to the present disclosure for converting rotational motion to reciprocating linear motion includes harnessing a first rotational motion about a first axis; translating the first rotational motion into a second rotational motion about a second axis that is transverse to the first axis; and translating the second rotational motion into a reciprocating linear motion that is parallel to the second axis.

Systems and methods according to the present disclosure may be used for facilitating conversion between reciprocating linear motion and rotational motion in any application where such a conversion is desired.

BRIEF DESCRIPTION OF THE DRAWINGS

FIG. 4 is a schematic illustration of systems according to the present disclosure for facilitating conversion between reciprocating linear motion and rotational motion, including illustration of the reciprocating linear motion and the rotational motion.

FIG. 5 is a schematic illustration of systems according to the present disclosure, the illustrated systems including an element that both linearly reciprocates and rotates.

FIG. 6 is a schematic illustration of systems according to the present disclosure, the illustrated systems including a continuous undulating track circumscribing a circular profile and generally defining a cylindrical volume.

FIG. 13 is a cross-sectional view of a portion of the compressed-air engine of FIG. 11, taken along 13-13.

FIG. 14 is an isometric exploded view of portions of a non-exclusive example of the system for facilitating conversion between reciprocating linear motion and rotational motion incorporated into the compressed-air engine of FIG. 11.

FIG. 15 is an isometric partially exploded view of the system for facilitating conversion between reciprocating linear motion and rotational motion incorporated into the compressed-air engine of FIG. 11.

FIG. 16 is an isometric view of the system for facilitating conversion between reciprocating linear motion and rotational motion incorporated into the compressed-air engine of FIG. 11.

FIG. 18 is a side view of a piston, connecting rod, retaining nut, and washers of the engine of FIG. 17.

FIG. 19 is a somewhat schematic view of the connecting rod and piston of FIG. 18.

FIG. 20 is a top view of an interchanger unit according to the present disclosure.

FIG. 21 is a side view of the interchanger unit of FIG. 20.

FIG. 22 is a schematic illustration of rollers of an interchanger unit according to the present disclosure illustrating movement within a track.

FIG. 23 is a side view of a piston, connecting rod, and interchanger unit according to the present disclosure.

FIG. 24 is an exploded view of a connecting rod and interchanger unit according to the present disclosure.

FIG. 25 is a partial cross-sectional view of an interchanger unit according to the present disclosure.

FIG. 26 is a top view of the thrust-bearing retainer and its associated screws of FIG. 25.

FIG. 27 is a side view of a rotating carrier unit according to the present disclosure.

FIG. 28 is a top view of the upper carrier bearing support of the rotating carrier unit illustrated in FIG. 27.

FIG. 29 is an exploded view of the rotating carrier of FIG. 27.

FIG. 38 is an exploded side view of an interchanger block, structure defining wave races and a spacer according to the present disclosure.

FIG. 39 is a side view of the interchanger block, structure defining wave races and spacer of FIG. 38 shown in an assembled condition.

FIG. 40 is a top view of the spacer FIG. 34.

FIG. 47 is a somewhat schematic representation of an engine cylinder and a mechanism for conversion between linear reciprocating motion and rotational motion according to the present disclosure shown with the piston in a top dead center position prior to an intake stroke.

FIG. 48 is a somewhat schematic representation of the structure of FIG. 47 shown with the piston during an intake stroke.

FIG. 49 is a somewhat schematic representation of the structure of FIG. 47 shown with the piston in a bottom dead center position.

FIG. 50 is a somewhat schematic representation of the structure of FIG. 47 shown with the piston during a compression stroke.

DETAILED DESCRIPTION

Figure 1:
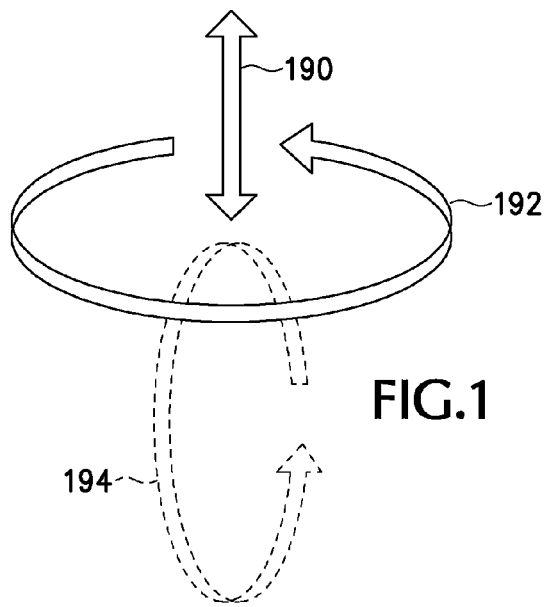
FIG. 1 is a schematic illustration of systems and methods according to the present disclosure for facilitating conversion between reciprocating linear motion and rotational motion.
Figure 2:
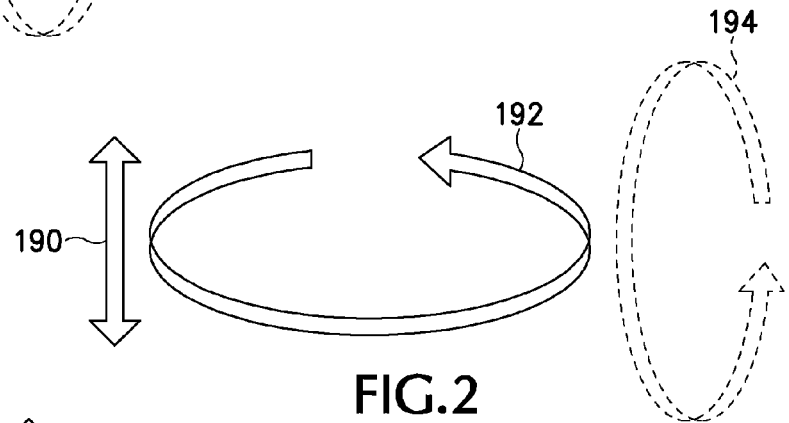
FIG. 2 is another schematic illustration of systems and methods according to the present disclosure for facilitating conversion between reciprocating linear motion and rotational motion.
Figure 3:
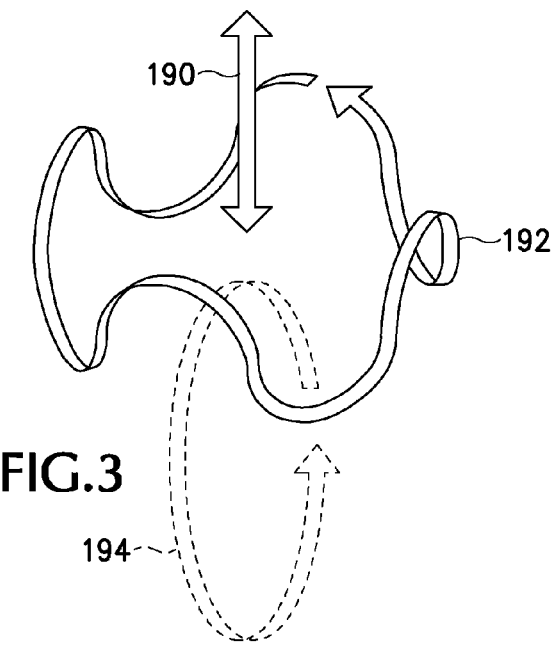
FIG. 3 is another schematic illustration of systems and methods according to the present disclosure for facilitating conversion between reciprocating linear motion and rotational motion.

FIGS. 1-3 schematically illustrate systems and methods according to the present disclosure for facilitating conversion between linear reciprocating motion 190 and rotational motion 192. In some methods and systems, the rotational motion 192 may be within a place that is perpendicular to the reciprocating linear motion 190. In some methods and systems, though not required, the rotation motion 192 may further be converted into a second rotational motion 194. In some such methods and systems, second rotational motion 194 may be within a plane that is perpendicular to the plane of the first rotational motion 192. As illustrated in FIGS. 1 and 2, the translation from linear reciprocating motion to rotational motion may occur in a generally vertical configuration, in a generally horizontal configuration, or in any suitable configuration as may be appropriate for a particular application of a system or method according to the present disclosure. Additionally, as schematically illustrated in FIG. 3, rotational motion 194 may simultaneously linearly reciprocate, creating a combined rotating and linearly reciprocating motion.

Systems according to the present disclosure for facilitating conversion between linear reciprocating motion and rotational motion are schematically illustrated in FIG. 4 and indicated generally at 200. Systems 200 include a linear reciprocating element, or reciprocator, 202, a rotating element 204 configured to rotate about an axis 206, and a mechanism 208 for facilitating conversion between the reciprocating linear motion of element 202 and the rotational motion of element 204.

In systems where linear reciprocating motion is converted, or translated, into rotational motion, a system 200 may include a subsystem 210 for harnessing a linear component of a force. For example, the force may be created by the combustion of fuel within a combustion chamber of an internal combustion engine, by compressed air within a cylinder of a compressed-air engine, by a human exerting force on a pedal or other component of a human-powered vehicle, or by any other appropriate input depending on the particular application for which a system 200 may be configured or used.

In the example of an internal combustion engine incorporating a system of the present disclosure, subsystem 210 may include such standard components as a cylinder block, a cylinder head, a fuel delivery system, inlet and exhaust valves, spark plugs, etc. However, an internal combustion engine incorporating a system according to the present disclosure, rather than including an engine cooling system (e.g., in a water-cooled engine or an air-cooled engine), may (but is not required to) have a subsystem 210 that includes insulation of the cylinder block and/or related components. Such insulation may further increase the efficiency of a given engine because the higher the temperature of the combustion gases, the higher the effective pressure on the piston during a power stroke of the engine.

Conversely, in the example of a compressed-air engine incorporating a system of the present disclosure, subsystem 210 may (but is not required to) include means for drawing heat into the cylinder. Such a subsystem may further increase the efficiency of a given engine, again because the higher temperature of the working fluid (i.e., compressed air in a compressed-air engine), the higher the effective pressure within the cylinder and thus the higher the force on the piston during a power stroke of the engine. As compressed air expands into and within a cylinder of a compressed-air engine, it naturally cools. Accordingly, by drawing heat into the cylinder, the compressed air may maintain a higher overall pressure for the duration of a power stroke.

In systems where rotational motion is converted, or translated, into linear reciprocating motion, a system 200 may include a subsystem 212 for harnessing a rotational input motion that is desired to be converted into a reciprocating linear output motion.

As schematically illustrated in FIG. 5, mechanism 208 may include an element 214 that is configured to both linearly reciprocate along and rotate about an axis 216. Element 214 may also be described as a converter. In some systems, axis 216 may be parallel to, or aligned with, the linear motion of reciprocator 202 as generally illustrated in FIG. 2. Stated differently, reciprocator 202 may be configured to linearly reciprocate along the axis about which converter 214 rotates. In such context, "along" may be either parallel or coaxial, and is not limited to only being coaxial. Stated differently, converter 214 may be configured to rotate within a plane that is perpendicular to the linear motion of reciprocator 202.

As schematically illustrated in dashed lines in FIG. 5, axis 206 of rotating element 204 is not required to be parallel or coaxial to the linear motion of reciprocator 202, and similarly is not required to be parallel or coaxial to the axis of rotation of converter 214 (i.e., axis 216). For example, axis 206 may be transverse to axis 216 and/or the linear motion of reciprocator 202. Additionally or alternatively, axis 206 may be perpendicular to axis 216 (e.g., if axis 206 and axis 216 are coplanar). Additionally or alternatively, rotating element 204 may rotate within a plane that is parallel to or aligned with the linear motion of reciprocator 202 and/or axis 216. Other configurations are equally within the scope of the present disclosure, and systems 200 are not limited to the two non-exclusive configurations schematically illustrated in FIG. 5.

As schematically illustrated in FIG. 6, mechanism 208 may include a continuous undulating track 220 circumscribing a circular profile (e.g., as viewed from above or below in the perspective of FIG. 6) and generally defining a cylindrical volume 222 having a central axis 224. In such embodiments, converter 214 may include a portion 226 that is engaged with the track and a portion 228 that is coupled to reciprocator 202. Accordingly, if and when reciprocator 202 is caused to linearly reciprocate, converter 214 will reciprocate with it. As converter 214 reciprocates, it will be forced to rotate about its axis 216 as portion 226 rides along track 220. Similarly, if and when converter 214 is caused to rotate, it will be forced to linearly reciprocate as portion 226 rides along track 220. As converter 214 reciprocates, reciprocator 202 will reciprocate with it. In some embodiments, though not required, portion 228 may be rotationally coupled to reciprocator 202 such that converter 214 may rotate relative to reciprocator 202.

Portion 226 of converter 214 may take a variety of configurations. For example, converter 214 may include one or more rollers configured to engage and roll along track 220. In such embodiments, track 220 may be defined by a surface 230. As used herein, "rollers" includes gears. Similarly, "surfaces" includes toothed surfaces, for example, configured to mesh with a corresponding gear.

The linear motion of reciprocator 202 may be described as being parallel, coaxial, or aligned with the central axis 224 of cylindrical volume 222. Likewise, the linear motion of converter 214 and the axis of rotation 216 of converter 214 may be parallel, coaxial, or aligned with the central axis of cylindrical volume 222. Stated differently, reciprocator 202 may be described as being configured to linearly reciprocate along the central axis of cylindrical volume 222. In such context, "along" may be either parallel or coaxial, and is not limited to only being coaxial.

Mechanism 208 may further include a second rotating element 232 configured to rotate about an axis 234. Axis 234 may be coaxial with central axis 224. Second rotating element 232 may also be described as a rotator. Rotator 232 may include a portion 236 that is engaged with converter 214 so that rotator 232 rotates with converter 214 and converter 214 linearly reciprocates relative to rotator 232. Portion 236 of rotator 232 may be defined by a track 238 defined by at least a surface 240, and converter 214 may include a portion 241 that is configured to ride along track 238. For example, portion 241 may include one or more rollers configured to engage and roll along track 238. Accordingly, as converter 214 rotates about axis 216, portion 241 will apply force to portion 236 of rotator 232 at a right angle, thereby maintaining a maximum leverage angle between converter 214 and rotator 232 for the full 360o of rotation of converter 214.

As schematically illustrated in FIG. 6 at 242, rotator 232 may be coupled to rotating element 204 so that if and when rotator 232 rotates, rotating element 204 rotates, and vice versa. As previously discussed and schematically illustrated in dashed lines, axis 206 of element 204 is not required to be coaxial with central axis 224.

Figure 7:
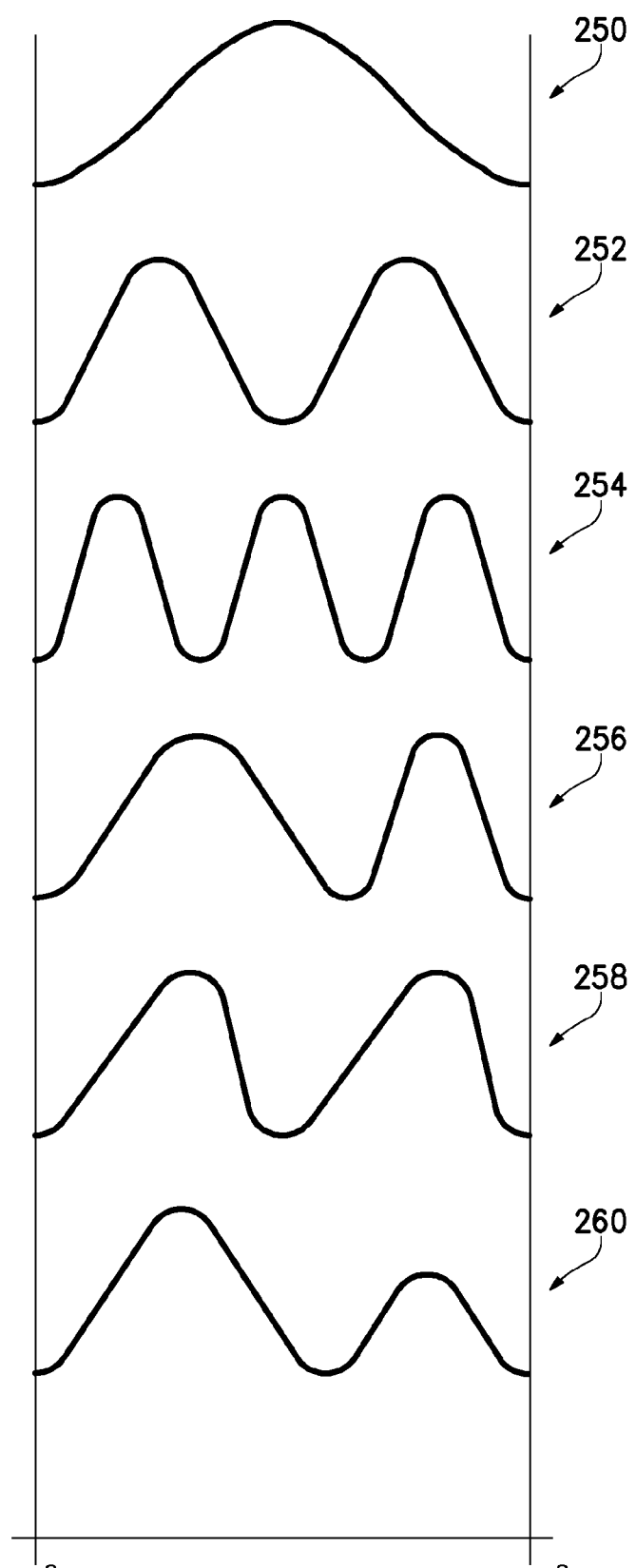
FIG. 7 is a graphical representation of non-exclusive examples of profiles of continuous undulating tracks that may be used in systems according to the present disclosure.

Undulating track 220 may take a variety of configurations depending on a particular application of a system 200. For example, the shape of track 220 may be predetermined for a particular desired output, whether reciprocating linear motion or rotational motion. Analogizing the shape of track 220 to a waveform, tracks 220 may have various quantities of cycles, various wavelengths, various amplitudes, various slopes, etc. FIG. 7 graphically illustrates non-exclusive examples of track shapes as a track extends around 360° of the cylindrical volume 222. Shape 250, for example, is sinusoidal and includes a single cycle. That is, for every single rotation of converter 214, the converter will reciprocate only once. Shape 252 includes two cycles of equal wavelengths and rather than being sinusoidal, includes linear portions (i.e., with constant slopes). Shape 254 includes three cycles of equal wavelengths. Shape 256, on the other hand, includes two cycles with different wavelengths. Shape 258 includes two cycles with a saw-tooth type profile. That is, each cycle of shape 258 has a down-slope that is steeper than its up-slope (or vice versa, depending on the direction of rotation). Shape 260 includes two cycles with different wavelengths and different amplitudes. The track shapes illustrated in FIG. 7 are provided as non-exclusive examples only, and the present disclosure is not limited to the illustrated shapes. Track shapes may incorporate portions of the shapes illustrated as well as any other appropriate shape for a particular application in which a system 200 is used.

Various shapes of tracks may be implemented for a variety of purposes. For example, the efficiency, power, torque, and other properties of a four-cycle internal combustion engine may be affected by the manipulation of the duration of the various strokes (i.e., intake, compression, power, and exhaust) relative to each other.

Additionally or alternatively, by varying the slope of various portions of the track, the conversion from reciprocating linear motion of an input force (e.g., harnessed from the combustion in an internal combustion engine or from air pressure in a compressed-air engine) to the rotational motion of an output torque (or vice versa), may be optimized. The slope of a given portion of track may be described in terms of an angle relative to the central axis 224, if the respective portion were perpendicularly projected on plane containing the central axis. For example, an optimum slope for the conversion from reciprocating linear motion to rotational motion (or vice versa) may be 45 degrees; however, other optimum slopes are equally within the scope of the present disclosure.

Additionally or alternatively, the radii of curvature of the peaks and troughs of a track shape may be varied to optimize a desired output. For example, the smaller the radii of curvature, the greater the lengths of track portions between peaks and troughs. However, optimum radii may exist for a particular system's configuration. For example, the transition of the converter from an up-slope to a down-slope (and/or vice versa) of the track may affect the wear on various parts of the system. For example, the shorter the radii of curvature, the harsher the transition of a converter from an up-slope to a down-slope (and vice versa) may be, simply due to the deceleration and subsequent acceleration in the vertical direction (when viewed from the perspective of the accompanying figures) of the converter.

The shape of the track may be described in terms of portions having slopes, or angles, that maximize the output torque or force corresponding to either rotational motion or linearly reciprocating motion output by a system, and when compared to the radii of curvature of the peaks and troughs of the track, may be described as accounting for a percentage of overall track length. For example, a track may include portions that are angled relative to the central axis to maximize the output torque or force and that account for at least 50 percent of the track. Additionally or alternatively, a track may include portions that are angled relative to the central axis to maximize the output torque or force and that account for at least 70 percent of the track. Additionally or alternatively, a track may include portions that are angled relative to the central axis to maximize the output torque or force and that account for at least 90 percent of the track. Additionally or alternatively, a track may include portions that are angled relative to the central axis to maximize the output torque or force and that account for at least 95 percent of the track. Additionally or alternatively, a track may include portions that are angled relative to the central axis to maximize the output torque or force and that account for at least 97 percent of the track. Additionally or alternatively, a track may include portions that are angled relative to the central axis to maximize the output torque or force and that account for at least 99 percent of the track. Other configurations are equally within the scope of the present disclosure.

Figure 8:
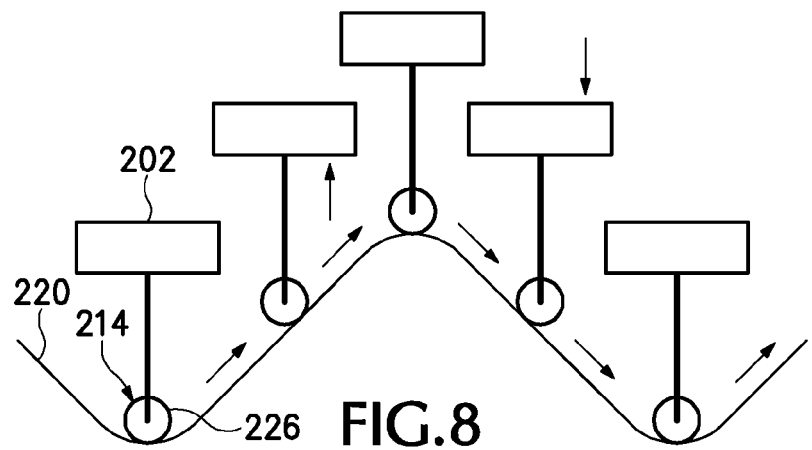
FIG. 8 is a schematic illustration of a reciprocator and a converter of a system according to the present disclosure as the converter travels along an undulating track.
Figure 9:
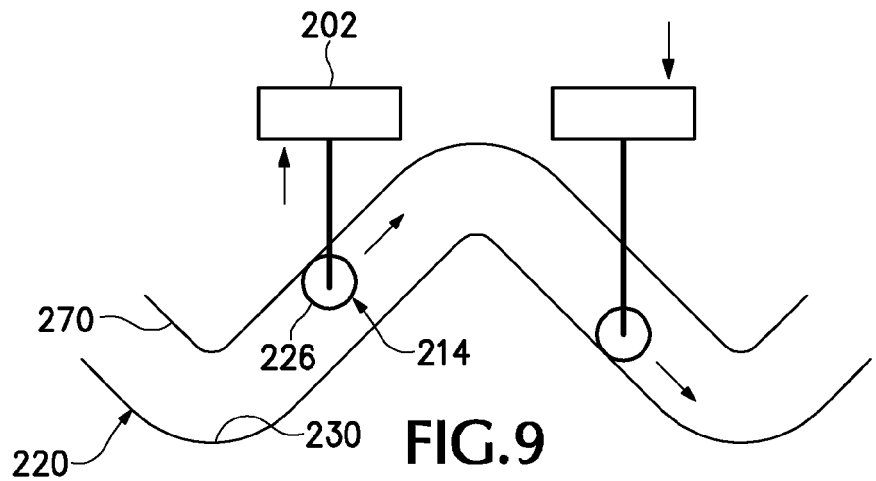
FIG. 9 is a schematic illustration of a reciprocator and a converter of a system according to the present disclosure as the converter travels along an undulating track defined by spaced apart opposing surfaces.
Figure 10:
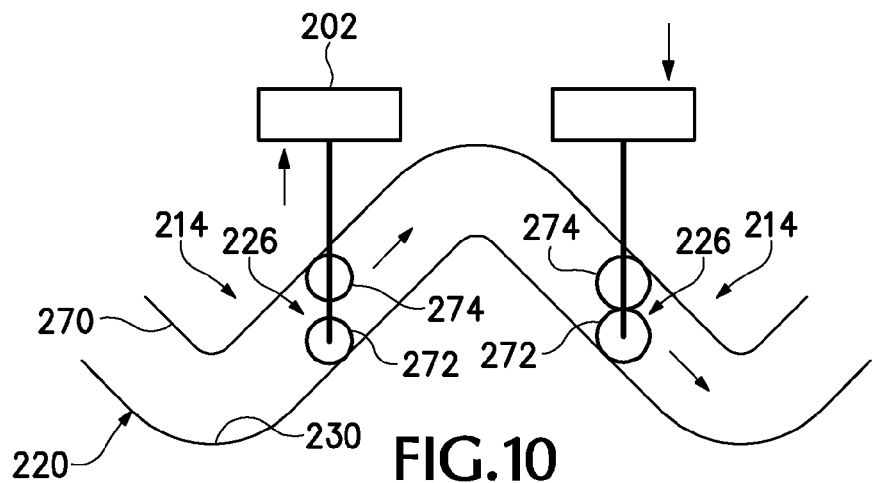
FIG. 10 is schematic illustration of a reciprocator and a converter of a system according to the present disclosure as the converter travels along an undulating track defined by spaced apart opposing surfaces, the converter illustrated in two distinct configurations.

FIGS. 8-10 schematically illustrate the reciprocation of reciprocator 202 and the corresponding reciprocation and rotation of converter 214 relative to track 220. As indicated by the vertical arrows, an upward force on the reciprocator will cause the converter to travel up the track's slope, and a downward force on the reciprocator will cause the converter to travel down the track's slope. Similarly, an input of rotational motion will cause the converter to travel along the track.

FIG. 9 schematically illustrates a track 220 that is defined by a pair of spaced apart surfaces. Stated differently, track 220 may be defined by a first surface 230 and a second surface 270 opposing and spaced from the first surface. In this illustration, portion 226 of converter 214 includes a single roller. As the converter reciprocates in a first direction and the roller rides along the track on an up-slope, the roller engages second surface 270, and as the converter reciprocates in a second and opposite direction and the roller rides along the track on a down-slope, the roller engages first surface 230. In such a configuration (i.e., a single roller between spaced apart surfaces), the surfaces of the track must be spaced greater than the diameter of the roller. Otherwise, the roller will be prevented from actually rolling and instead will drag through the track. However, the space between the two surfaces should not be too great, or the transition from an up-slope to a down-slope (and/or vice versa) may be harsh, as the roller transitions from the second surface to the first surface (and/or vice versa).

FIG. 10 schematically illustrates two distinct configurations of a portion 226 of a converter 214. In both configurations illustrated, portion 226 includes a first roller 272 engaged with first surface 230 of track 220 and a second roller 274 engaged with second surface 270 of track 220. In the example illustrated at left and riding along the up-slope of the track, the first and second rollers are spaced from each other and may independently roll along the corresponding surfaces of the track. In the example illustrated at right and riding along the down-slope of the track, the first and second rollers are not spaced apart from each other and are instead engaged with each other. Accordingly, as first roller 272 rotates clockwise to roll along first surface 230 and second roller 272 rotates counter clockwise to roll along second surface 270, the surfaces of the rollers are in rolling contact with each other.

Systems 200 according to the present disclosure may be used in a variety of applications. As mentioned, reciprocating engines often convert the reciprocating linear motion of a piston or pistons into the rotational motion of a crankshaft using a connecting rod and crank configuration. An engine's power, torque, and efficiency are all affected by how well the engine converts the reciprocating linear motion to rotational motion. The replacement of the typical connecting rod and crank configuration with systems 200 according to the present disclosure in a given engine will provide dramatic improvements to the engine's power, torque, and efficiency. This is because, except when portion 226 of converter 214 is engaged with a peak or trough of the undulating track, maximum leverage between the reciprocating linear motion of reciprocator 202 and the track for the transition to rotational motion of converter 214, is maintained during the entire 360° rotation of converter 214. Compare this to a traditional connecting rod and crank configuration of an internal combustion engine, where an effective 90° maximum leverage angle between a piston's reciprocating motion and the crank only occurs at a single point during a power stroke. Further, this single instant where maximum leverage exists in a connecting rod and crank configuration does not occur when the combustion forces within the cylinder are at their greatest (i.e., at top dead center). Rather, by the time the maximum effective leverage angle is reached, the combustion forces have considerably decreased due to the expansion in volume and cooling of the combustion gases. Typically, in a connecting rod and crank configuration, the maximum effective leverage angle is not reached until after the piston has traveled 40% of its stroke from top dead center.

On the other hand, internal combustion engines incorporating systems 200 according to the present disclosure (depending on the particular shape of undulating track used) may reach maximum effective leverage at the instant of maximum combustion pressure, within 1% of the piston's stroke from the top dead center position, within 2% of the piston's stroke, within 3% of the piston's stroke, within 4% of the piston's stroke, within 5% of the piston's stroke, within 10% of the piston's stroke, within between about 1% and 5% of the piston's stroke, or within another percentage of the piston's stroke depending on the particular configuration of system 200 used.

The above principles equally apply to compressed-air engines incorporating systems according to the present disclosure. In compressed-air engines, the pressure of air injected into a cylinder, like the combustion gases of an internal combustion engine, also decreases as the piston reciprocates due to expansion in volume of the injected air.

In some instances, by simply replacing the standard connecting rod crank configuration with a system 200, an engine's power may be increased by 25%, by 50%, by 100%, by 200%, by between 25% and 50%, by between 50% and 100%, by between 100% and 200%, or by even greater than 200%, 500%, or even 800%.

Additionally or alternatively, in some instances, by simply replacing the standard connecting rod crank configuration with a system 200, an engine's torque may be increased by 25%, by 50%, by 100%, by 200%, by between 25% and 50%, by between 50% and 100%, by between 100% and 200%, or by even greater than 200%, 500%, or even 800%.

Additionally or alternatively, in some instances, by simply replacing the standard connecting rod crank configuration with a system 200, an engine's efficiency may be increased by 25%, by 50%, by 100%, by 200%, by between 25% and 50%, by between 50% and 100%, by between 100% and 200%, or by even greater than 200%, 500%, or even 800%.

Other additional benefits of incorporating a system 200 into an internal combustion engine may include: longer effective piston stroke and greater combustion ratios; less thermal loss and cooler exhaust due to more room for gas expansion; less piston friction due to balanced piston rod versus a crankshaft offsetting pressure on a connecting rod and piston assembly; less RPMs required resulting in less friction and less thermal and energy losses due to catching up to a slower receding piston; the ability to adjust the diameter and shape of the undulating track for specific torque requirements; more consistent power band and the ability to run leaner fuel.

Figure 11:
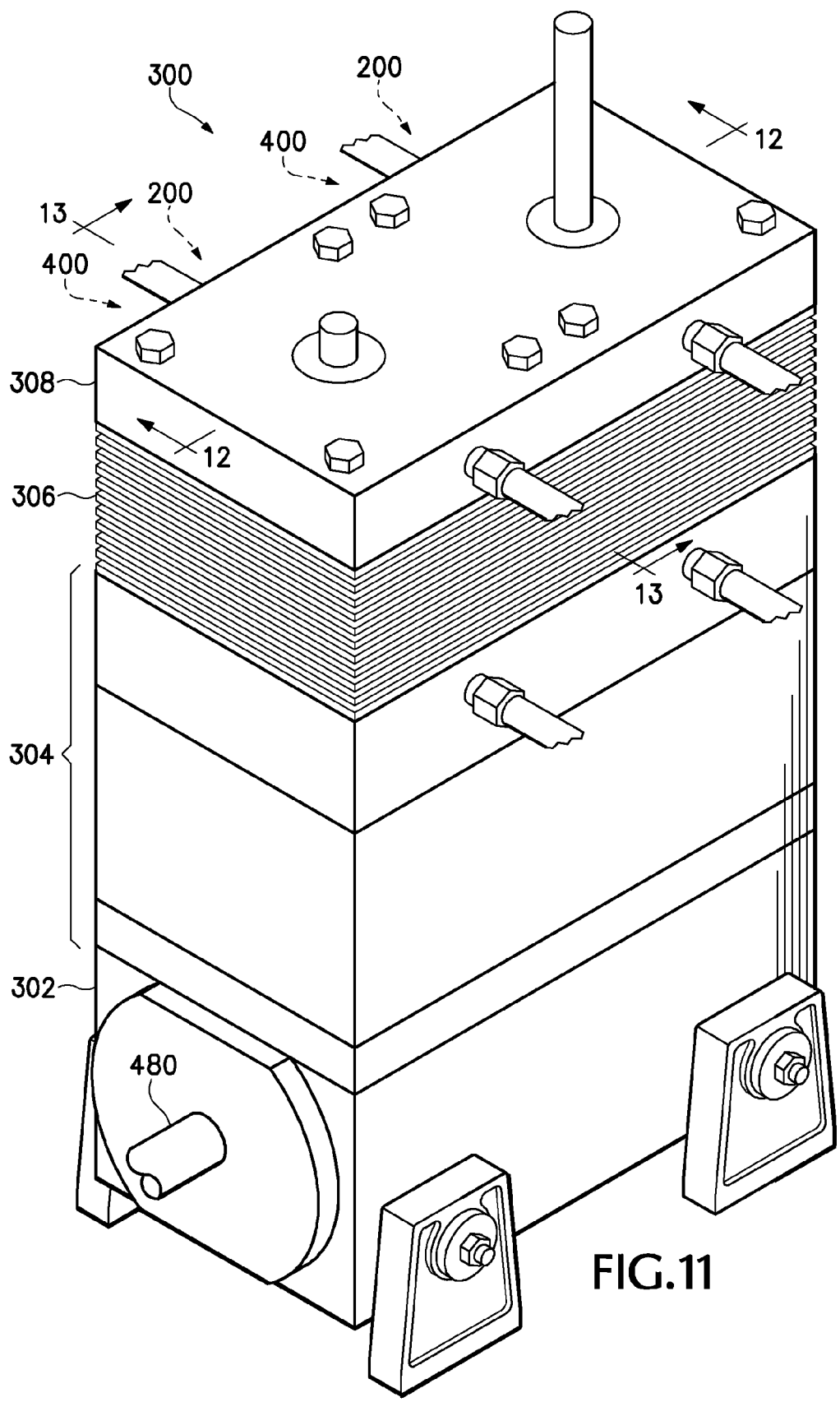
FIG. 11 is an isometric view of a compressed-air engine according to the present disclosure, the engine including systems for facilitating conversion between reciprocating linear motion and rotational motion according to the present disclosure.
Figure 12:
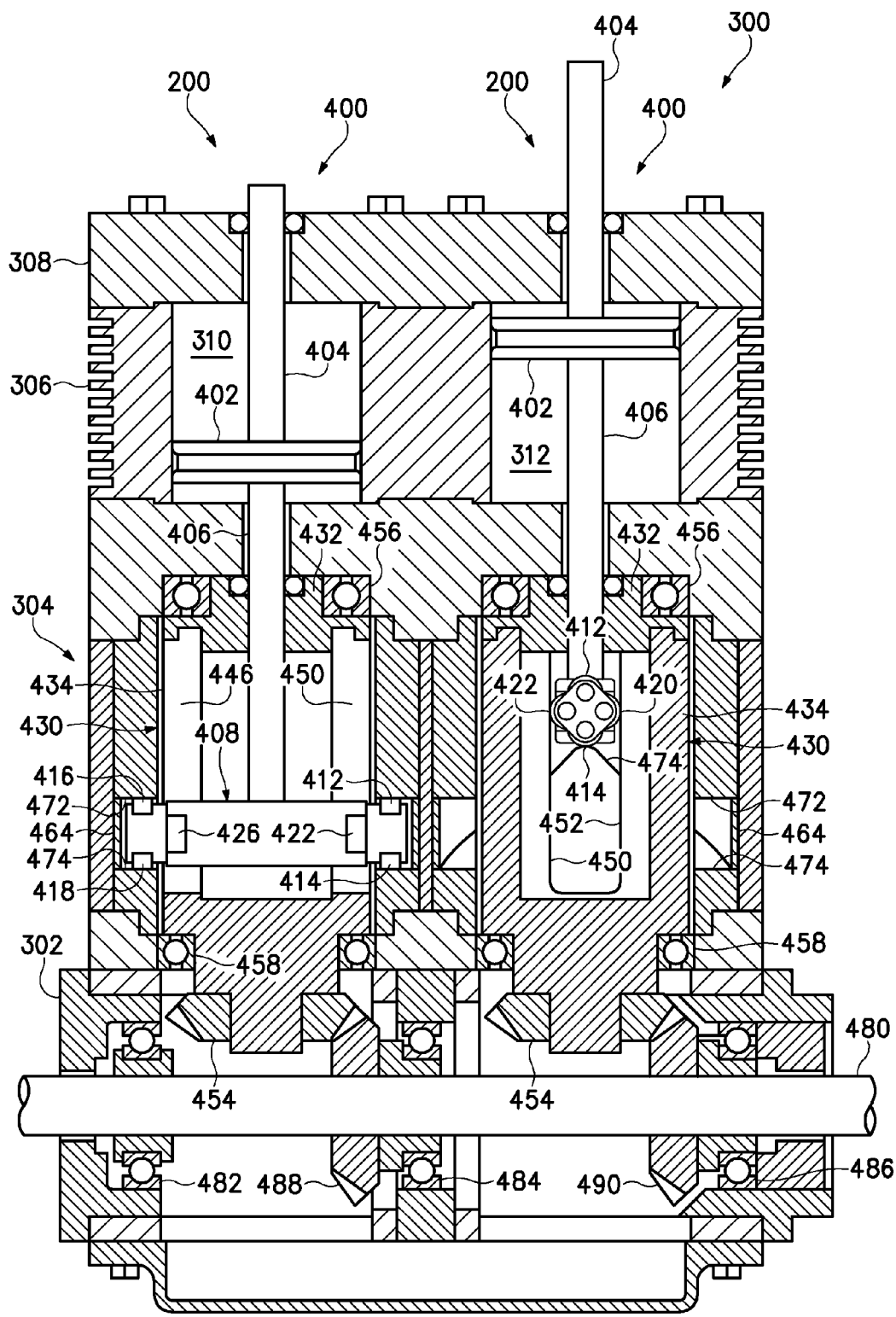
FIG. 12 is a cross-sectional view of the compressed-air engine of FIG. 11, taken along 12-12.

FIGS. 11-16 illustrate a non-exclusive example of a two-cylinder compressed-air engine 300, and portions thereof, incorporating two non-exclusive examples of systems 200 according to the present disclosure and generally indicated at 400. As best seen in FIGS. 11 and 12, engine 300 includes an output-shaft case 302, a conversion block 304, a cylinder block 306, and a cylinder head 308. Such structural components as well as other components described herein may be made of aluminum, steel, or any other material appropriate for a particular configuration and/or application of an engine 300. Any number of cylinders may be incorporated into engines according to the present disclosure, and engines are not limited to including only two cylinders.

The two systems 400 incorporated into engine 300 are identical, and therefore like reference numerals are used with respect to each component thereof; however, engines according to the present disclosure are not required to incorporate identical systems 200 when more than one system is included.

Engine 300 includes a first cylinder 310 and a second cylinder 312, and as shown in FIG. 10, each cylinder includes an upper inlet 318, an upper outlet 320, a lower inlet 322, and a lower outlet 324. Valving (not shown) provides for the delivery and exhaustion of compressed air to and from the cylinder. A non-exclusive example of an inlet valve that may be used with engine 300 is a Parker Schrader Bellows part no. N31461089. A non-exclusive example of an exhaust valve that may be used with engine 300 is a Parker Schrader Bellows valve no. N37471089. The inlet and exhaust valves may be controlled by separate pilot valves. A non-exclusive example of a pilot valve that may be used with engine 300 is a KIP Inc. solenoid valve no. V351046. The pilot valve may be controlled by a computer to appropriately time the delivery and exhaustion of compressed air to and from the cylinders on respective sides of the pistons.

A system 400 includes a piston 402 having a first piston rod 404 coupled to the top side of the piston (when viewed from the perspective of the accompanying figures) and a second piston rod 406 coupled to the bottom side of the piston. One of—or a combination of—the piston and the piston rods may be described as a reciprocator 202 of a system 200 according to the present disclosure. Though not required, the first piston rod 404 is provided so that the surface area on one side of a piston is equal to the surface area on the opposite side of the piston. Accordingly, when a given pressure of compressed air is delivered above a first piston in a first cylinder and below a second piston in a second cylinder, the same force will be generated on both pistons.

Second piston rod 406 is coupled to a non-exclusive example of a converter 214 indicated at 408. Converter 408 includes a bearing 410 so that converter 408 may rotate relative to second piston rod 406. Accordingly, as the piston and the converter reciprocate together, the piston will not be forced to rotate within the cylinder as the converter rotates.

Converter 408 includes two portions 226, each in the form of a pair of rollers: a first roller 412 in rolling contact with a second roller 414, and a third roller 416 in rolling contact with a fourth roller 418. These two pairs of rollers are further in rolling contact with the continuous undulating track 220 discussed in more detail below.

Converter 408 further includes two portions 241, each in the form of a pair of rollers: a fifth roller 420 in rolling contact with a sixth roller 422, and a seventh roller 424 in rolling contact with an eighth roller 426. These two pairs of rollers are further in rolling contact with the tracks 238 of rotator 232 discussed in more detail below.

System 400 further includes a non-exclusive example of a rotator 232, indicated at 430. Rotator 430 is generally cylindrical and includes a top disc-shaped portion 432 press-fit onto a main portion 434. A first passage 436 is provided in the disc-shaped portion and through which second piston rod 406 extends. A second passage 438 and a third passage 440 are provided in the main portion and through which converter 408 extends. Passages 438, 440 define tracks 238 in the form of a first linear track 442 and a second linear track 444. First linear track 442 is further defined by a first surface 446 and a second surface 448 opposing and spaced from first surface 446. Second linear track 444 is further defined by a first surface 450 and a second surface 452 opposing and spaced from first surface 450.

Fifth and sixth rollers 420, 422 of converter 408 are in rolling contact with first and second surfaces 446, 448 of first linear track 442, respectively, and seventh and eighth rollers 424, 426 of converter 408 are in rolling contact with first and second surfaces 450, 452 of second linear track 444, respectively.

Rotator 430 further includes a 45 degree miter gear 454 secured to the lower portion thereof.

Rotator 430 is rotationally coupled to the converter block 304 (seen in FIG. 12) by a top bearing 456 and a bottom bearing 458.

Referring to FIGS. 15 and 16, system 400 further includes a first track portion 460 and a second track portion 462 spaced from the first track portion by a spacer 464. The first and second track portions thereby define a non-exclusive example of a continuous undulating track 220, indicated at 470. First track portion 460 includes a first track surface 472, and second track portion 462 includes a second track surface 474. Accordingly, track 470 may be described as being defined by first track surface 472 and second track surface 474 opposing and spaced from first track surface 472. Although track 470 is illustrated as having two cycles of equal wavelength and amplitude, other configurations of tracks 220 may be incorporated into systems 400 according to the present disclosure.

Track 470 may be described as circumscribing a circular profile and generally defining a cylindrical volume having a central axis. Rotator 430 may be described as being positioned within the cylindrical volume. Converter 408 may be described as being positioned at least partially within rotator 430.

Referring back to FIG. 12, an output shaft 480 is rotationally supported in output-shaft case 302 by a series of bearings 482, 484, 486. Coupled to the output shaft is a pair of 45 degree miter gears 488, 490 that are engaged with miter gears 454 of systems 400. Accordingly, the rotational motion of rotator 430 is translated 90 degrees to the rotational motion of the output shaft. Output shaft 480 may be coupled to any appropriate system desired. For example, an engine 300 may be incorporated into a vehicle, into an electric power plant, or into any suitable system where rotational motion is a desired output. Output shaft 480 may be described as a non-exclusive example of a rotating element 204 according to the present disclosure.

The disclosure below is substantially the same as the disclosure of U.S. application Ser. No. 11/544,817, from which the present application claims priority. In the event that the disclosure below defines or uses a term or terms in a manner inconsistent with the disclosure above or the claims of the present application, the term or terms as used below only control with respect to the disclosure below.

Referring to FIGS. 17-54, a non-exclusive example of an internal combustion engine according to the present disclosure comprises a block 10, which is composed of a cylinder block 12, interchanger block 16, and crankcase 104, having bores defined by cylinders 20, cylinder head 22, intake means 24, ignition means 28, exhaust means 26, pistons 30, wave races 70 (upper) and 74 (lower), interchanger units 60, rotating carriers 50, driver and driven gears 82 and 88, crankshaft 90, lubrication means 112 and various working and support bearings 52, 56 and 100.

Pistons 30 may be described as non-exclusive examples a reciprocator 202 according to the present disclosure. Interchanger units 60 may be described as non-exclusive examples of a converter 214 according to the present disclosure. Rotating carriers 50 may be described as non-exclusive examples of a rotator 232 according to the present disclosure. Wave races 70, 74 may be described as non-exclusive examples of first and second surfaces 230, 270 according to the present disclosure and that define a continuous undulating track 220 according to the present disclosure.

Figure 30:
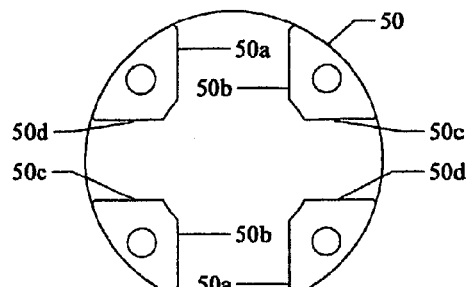
FIG. 30 is a top view of the rotating carrier of FIG. 27.
Figure 31:
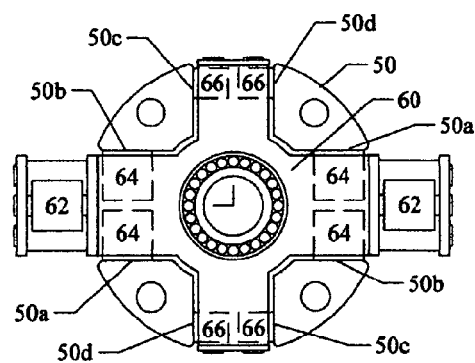
FIG. 31 is a top view a rotating carrier unit and an interchanger unit according to the present disclosure.
Figure 32:
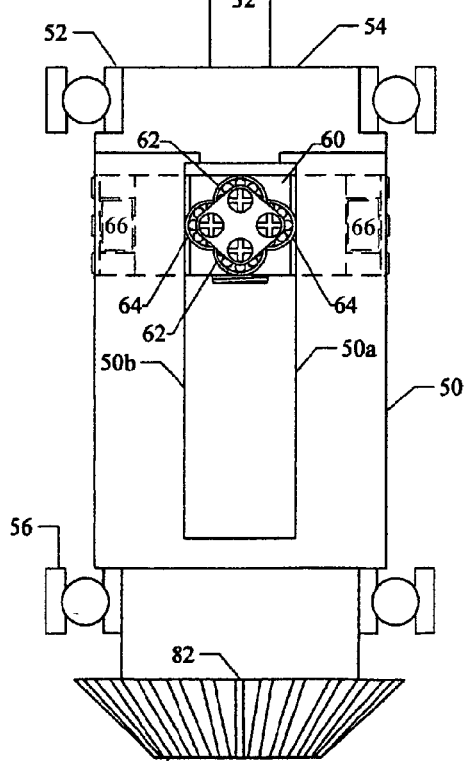
FIG. 32 is a side view of a piston, a connecting rod, an interchanger unit, and rotating carrier unit according to the present disclosure shown with the piston corresponding to a top dead center position.
Figure 33:
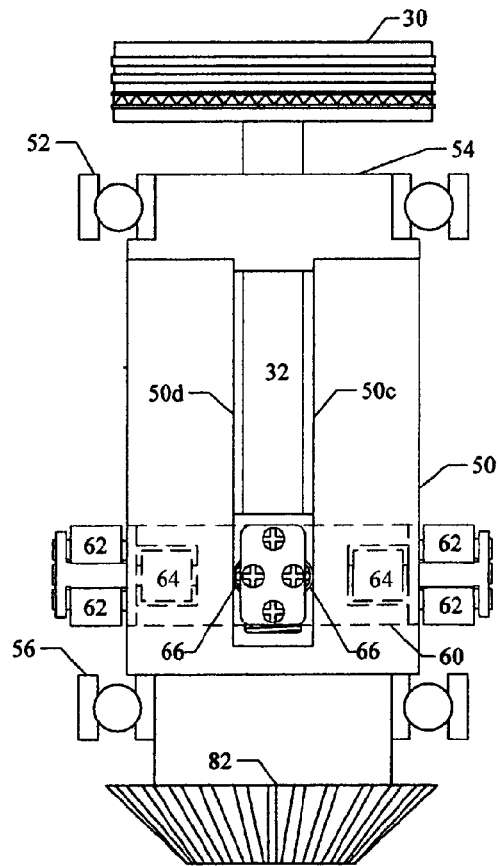
FIG. 33 is another side view of the piston, connecting rod, interchanger unit, and rotating carrier unit of FIG. 32 shown with the piston corresponding to a bottom dead center position.
Figure 34:
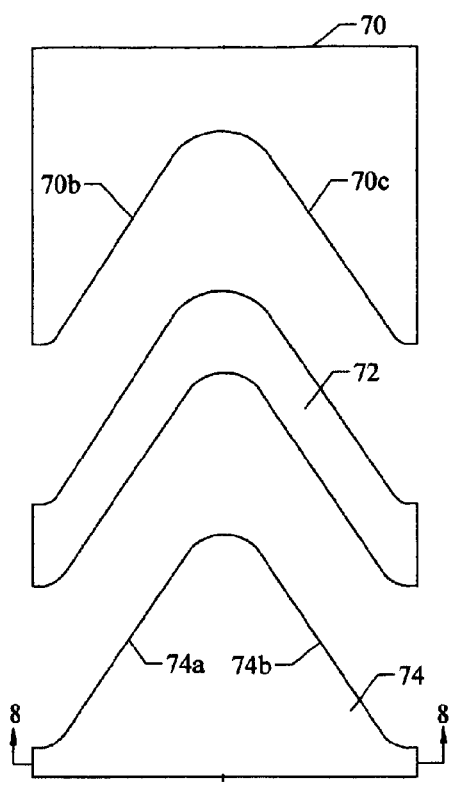
FIG. 34 is an exploded view of structure defining upper and lower wave races and a spacer according to the present disclosure.
Figure 35:
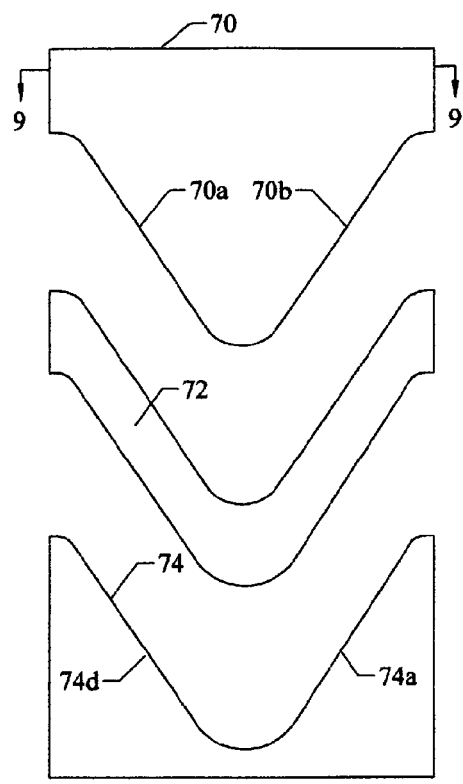
FIG. 35 is another exploded view of the structure defining the upper and lower wave races and the spacer of FIG. 34.
Figure 36:
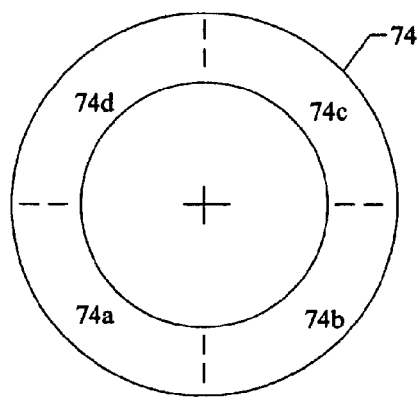
FIG. 36 is a top view of the structure defining the lower wave race of FIG. 34.
Figure 43:
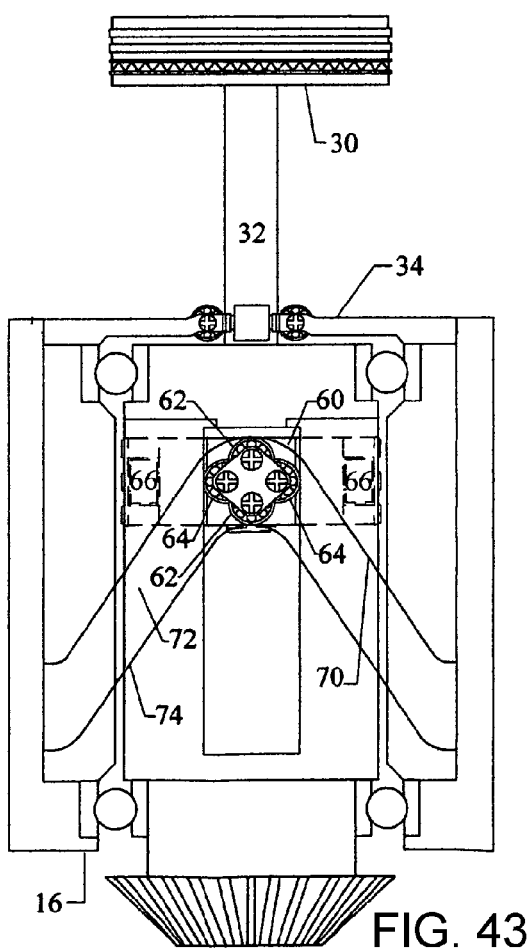
FIG. 43 is a side view of the piston, connecting rod, interchanger unit, and wave-shaped track of FIG. 42 shown further with a rotating carrier unit and a stabilizer unit according to the present disclosure.

In the embodiment illustrated, the rotating assembly (which may be described as a non-exclusive example of a system 200 according to the present disclosure) as shown in FIG. 43, is composed of three main components functioning together: an interchanger unit 60, as shown in FIGS. 20, 21, and 23, having track rollers 62, which ride between two wave shaped races 70 and 74 that are parts of a stationary mounted cylindrical unit as shown in FIG. 39. The third component is a rotating carrier unit 50, mounted on bearings 52 and 56, with the top bearing 52, mounted on a support 54, that also adds stability to the carrier, as shown in FIG. 27, in which the interchanger 60 rides up and down in to keep the interchanger 60 centered by means of centering rollers 66, riding on the carrier tracks 50c and 50d as seen in FIGS. 29-31, to maintain correct orientation of the track rollers 62, on the races 70 and 74. The carrier 50 also transfers the converted rotational motion from the interchanger 60 by means of the power transfer rollers 64, riding on the carrier tracks 50a and 50b as shown in FIGS. 27, 30, and 31, to the output shaft 90, via gears 82 and 88 as shown in FIGS. 17, 27, 29, 43 and 47-54. Referring to FIGS. 47-54, are illustrations of the engine through the four cycles of an Otto cycle or Diesel cycle engine from beginning to end starting with the piston 30, ready to begin the intake cycle, then continuing through the compression cycle, combustion cycle and ending with the exhaust cycle. In FIGS. 47-54 it shows the movement of the track rollers 62 as they traverse up and down the slopes 74a, 74b, 74c, 74d and 70a, 70b, 70c, 70c of the wave races 74 and 70, as also shown in FIGS. 34-37.

Figure 37:
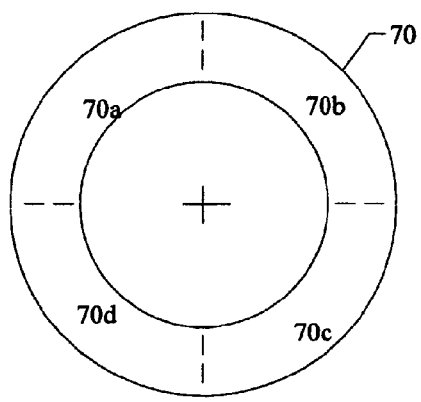
FIG. 37 is bottom view of the structure defining the upper wave race of FIG. 34.
Figure 41:
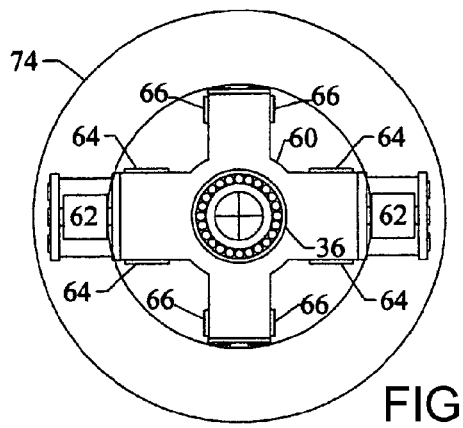
FIG. 41 is top view an interchanger unit and a lower wave race according to the present disclosure.
Figure 44:
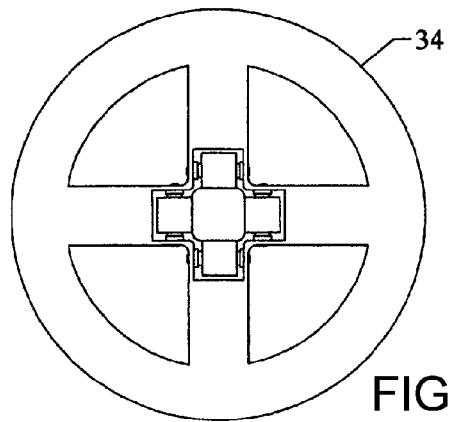
FIG. 44 is a schematic cross-sectional view of the connecting rod and stabilizer unit of FIG. 43.
Figure 42:
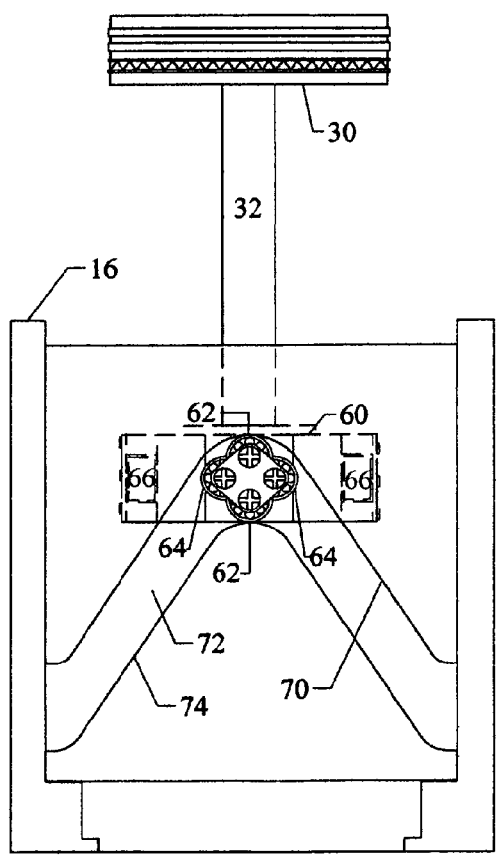
FIG. 42 is a side view of a piston, connecting rod, and interchanger unit according to the repent disclosure shown with the interchanger unit positioned in a wave-shaped track.

The interchanger 60 is so named because it converts reciprocating motion into rotational motion during the combustion cycle and then converts rotational motion to reciprocating motion during the intake, compression and exhaust cycles. The conversion from reciprocating motion to rotational motion is accomplished during the combustion stroke when the rollers 62 are forced at the same time down the declining slopes 1b and 2b, as shown in FIG. 37, causing a downward spiraling motion. Because the faces of the slopes 2b and 2b are of a 45 degree decline (after a short radius at the top), the downward pressure from the piston 30 is converted to rotational motion at a one to one ratio. This means that for every inch the piston 30, moves down, the interchanger will rotate an inch therefore converting the reciprocating motion of the piston 30 into rotational motion at a 90 degree angle to the axis of the interchanger and therefore achieve an optimal transfer of energy. The rotating carrier as seen in FIG. 28 then transfers the converted rotational motion to the output shaft 90, through the driver and driven gears 82 and 88, when the power transfer rollers 64, and interchange centering rollers 66, as seen in FIGS. 22-24, ride up and down the races 50a, 50*b*, 50*c* and 50*d*, of the carrier 50, while under the pressure created by the interchanger 60, as they follow the contours of the races 70 and 74.

Figure 17:
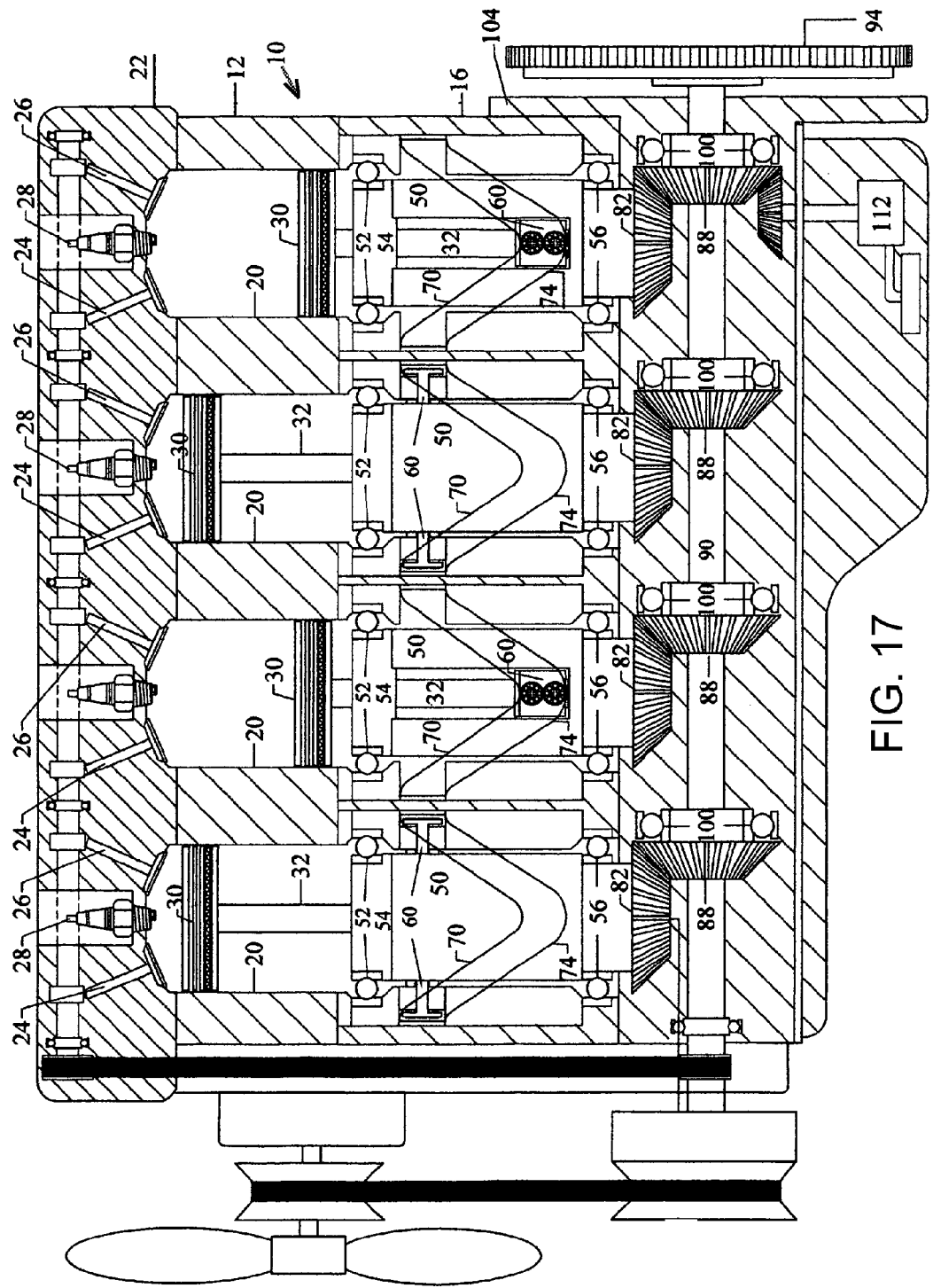
FIG. 17 is a partial cross-sectional side view of a four cylinder internal combustion engine according to the present disclosure, the engine including mechanisms for facilitating conversion between reciprocating linear motion and rotational motion according to the present disclosure.

The piston 30, is returned to the cylinder top (Top dead center) and through the remaining three strokes of the combustion cycle either by centrifugal force from the flywheel 94, as seen in FIG. 17, attached to the output shaft 90, or the power from other pistons connected to the same output shaft 90. A flywheel 94 is also used to ensure smooth rotation.

To help insure the performance and service life of the engine, the piston 30 is held from spinning inside the cylinder 20 by means of a stabilizer unit 34, as seen in FIGS. 43 and 43. The stabilizer unit 34 keeps the piston from spinning by means of four rollers that stay in contact with the four sides of the connecting rod 32, as shown in FIGS. 18 and 19. The piston 30 and connecting rod 32 are able to be restrained from spinning because they are attached to the interchanger 60 by means of thrust bearings 35, as seen in FIGS. 24 and 26. Also referring to FIGS. 18, 24, and 25, the retaining nut 43 and washers 41 and 42, thrust bearing retainer 37, and screws 39, as seen in FIGS. 25 and 26, also retain shock dampeners 35*a* and 35*b*, that help shield the thrust bearings 35 from shock created from combustion to the piston 30, or inertia during higher speeds of the engine as the track rollers 62 reach the top and bottom radiuses of the races 70 and 74.

Referring to FIG. 22, the track rollers are mounted in such a manner as to keep them in contact with each other. This contact is for the purpose of keeping them always spinning at the correct speed and direction as they ride on the races 70 and 74. The spacer 72, as seen in FIGS. 39 and 40 keeps the races 70 and 74 at the correct distance from each other to maintain close tolerance to the track rollers 62, but as the track rollers 62 follow the contours of the races 70 and 74, contact will fluctuate between the races, so to keep the track rollers 62 from skidding on the races or have to change in rotational direction, they are always kept spinning the correct direction and speed by always being in contact with the other roller. The track rollers 62 always being in contact with each other also allow the load subjected to one roller to be shared by both, therefore reducing the load that any one roller will have to bear on its own which will extend the service life of both rollers. The track rollers 62 and races 70 and 74 may be substituted for other means of accomplishing the same functions such as magnets, hydraulics, pressurized air or any other means that will facilitate a similar type working relationship that will yield the same results. The rotating assembly may also be configured to where the interchanger and carrier are mounted stationary with the races rotating around them or any other configuration that yields the same results.

Figure 45:
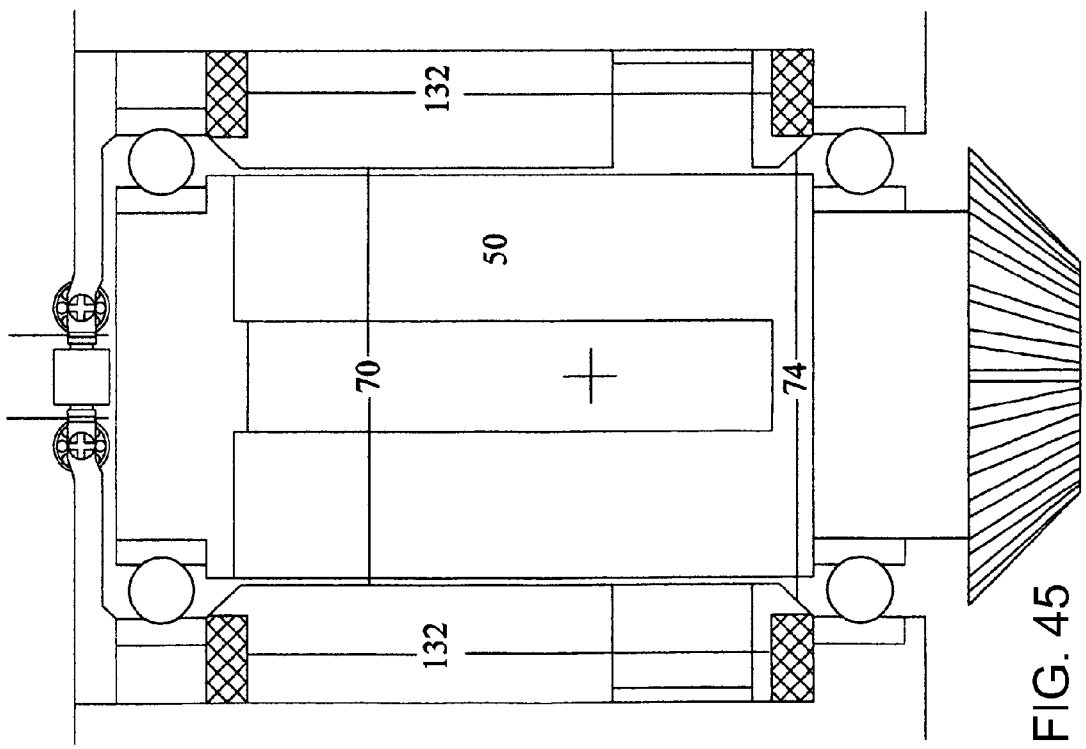
FIG. 45 is a side view of a rotating carrier unit positioned within structure defining a wave-shaped track, and a stabilizer unit according to the present disclosure.
Figure 51:
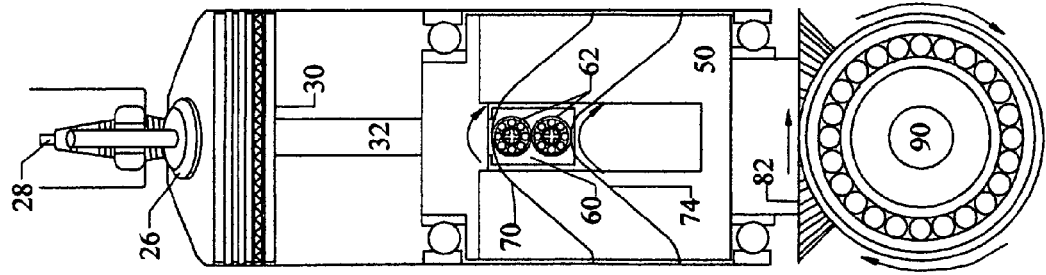
FIG. 51 is a somewhat schematic representation of the structure of FIG. 47 shown with the piston in a top dead center position prior to combustion, or power, stroke.
Figure 52:
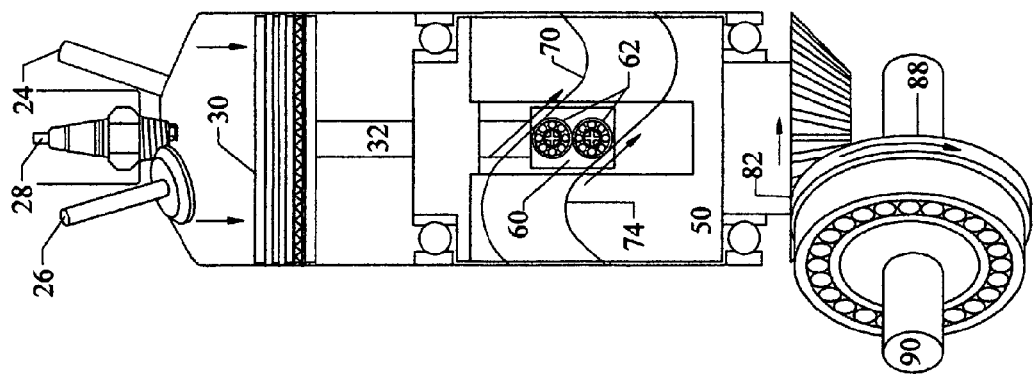
FIG. 52 is a somewhat schematic representation of the structure of FIG. 47 shown with the piston during a combustion stroke.
Figure 53:
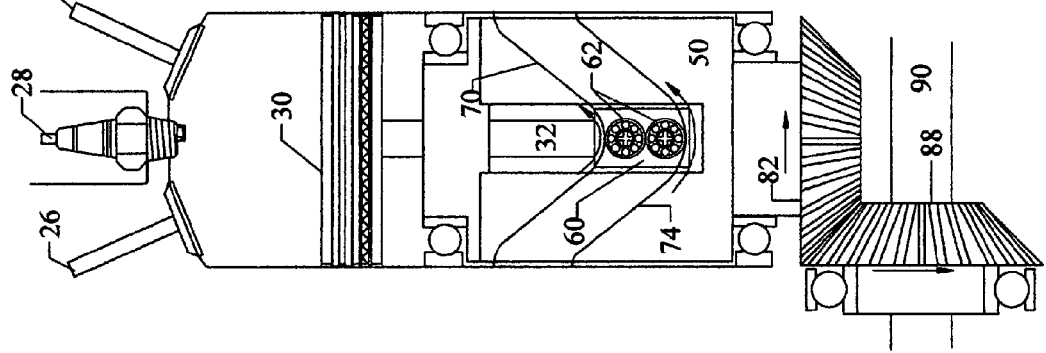
FIG. 53 is a somewhat schematic representation of the structure of FIG. 47 shown with the piston in a bottom dead center position prior to an exhaust stroke.
Figure 54:
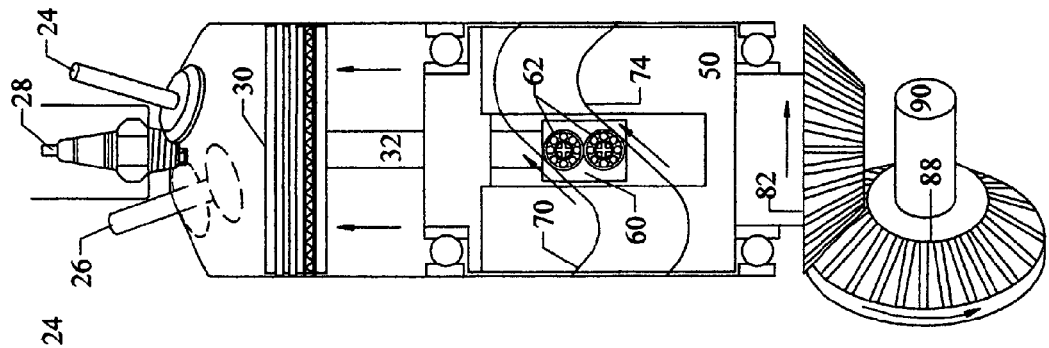
FIG. 54 is a somewhat schematic representation of the structure of FIG. 47 shown with the piston during an exhaust stroke.

Referring to FIG. 45, the races 70 and 74, are shown mounted on shock absorbing dampeners 132. These dampeners are installed to absorb and release shock created from combustion to the piston 30 or inertia during higher speeds of the engine as the track rollers 62 reach the top and bottom radiuses of the races 70 and 74. These dampeners 132 may be made of high density rubber or polyurethane type materials that offer a higher load-bearing capacity than rubber with more resistance to oils and chemicals found on the inside of an engine. This same rubber or polyurethane type materials will also be used in the shock dampeners 35*a* and 35*b* as seen in FIG. 24. Springs, conical washers, fluid, air or any other means may be substituted for the rubber or polyurethane dampeners 35*a*, 35*b* and 132.

Figure 46:
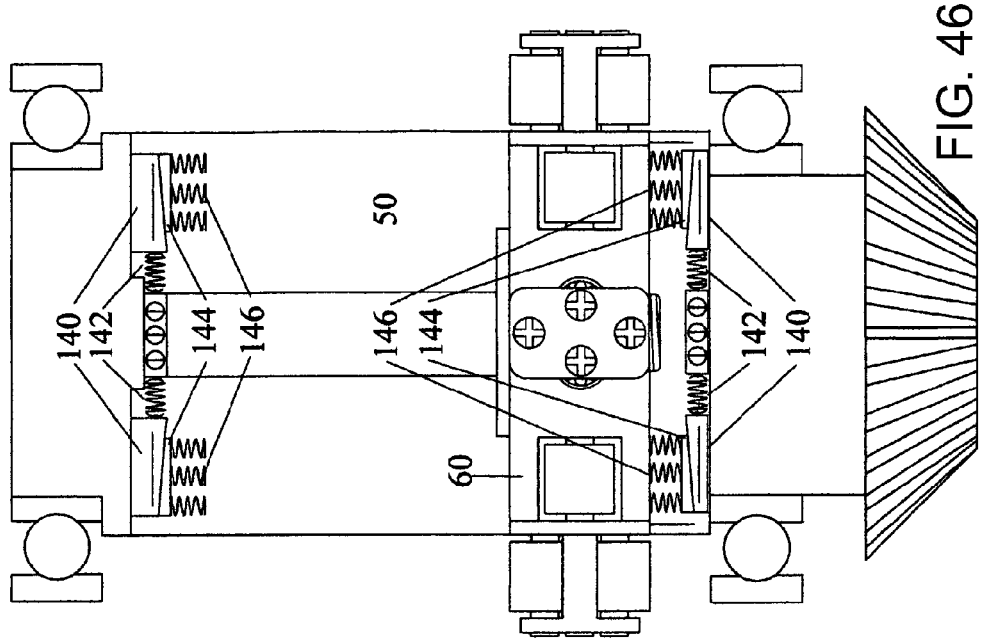
FIG. 46 is a side view of an interchanger unit and rotating carrier unit including a reciprocator system according to the present disclosure.

Referring to FIG. 46, a reciprocator system is shown installed in the carrier 50, which is operated by centrifugal force. As the speed (RPM's) of the engine increases, the inclined centrifugal weights 140, overcome the resistance of the centrifugal weight springs 142, allowing the weights to move outward from the center of the carrier 50. The resulting movement causes the reciprocator spring inclines 144 to move up creating more pressure on the reciprocator springs 146, therefore creating a speed sensitive mechanical means of absorbing the increasing amount of energy at the end of each stroke created by inertia as the speed (RPM's) of the engine increases, then releasing that energy back after the track rollers 62 pass the upper and lower radiuses of the races 70 and 74, therefore helping facilitate the reciprocating motion of the piston 30, connecting rod 32, and interchanger unit 60, for the purpose of increasing the performance, service life and dependability of the engine by reducing stress to the track rollers 62, interchanger unit 60, and races 70 and 74. This mechanical reciprocator system may be substituted for a different type of system that utilizes pressurized fluids, compressed air, magnets or other means to accomplish the same speed sensitive absorbing and releasing of energy process.

The materials to be used in the overall construction of the engine is expected to be aluminum, steel, rubber, plastics, automotive type gaskets and most any other materials commonly used in the manufacture of engines. Some exotic materials such as ceramics or specialty metals may be used in key areas such as the combustion chambers, rotating assemblies, etc. The materials to be used in the rotating assembly will generally be of high-grade steel or similar materials because they are subjected to high pressures and impact. A softer surface may be applied to the tracks 70 and 74, such as high-density rubber or polyurethane type materials to help reduce shock loads to the track rollers 62.

Many other parts and functions of this engine and overall construction were not discussed in detail or discussed very little in this description due to the nature of many parts, designs, functions and construction of this engine do not differ or differ very little from designs, and technology already well known and used for many years and therefore considered common knowledge and standard practice in the field of reciprocating engines. Some of these functions include but are not limited to fuel delivery system, lubrication means, ignition system, cooling system, compression ratios, combustion chamber sealing, high performance modifications, supercharging, turbocharging, previous designs, manufacturing procedures, materials of manufacture, maintenance, means for attaching this engine to machinery or transmission, etc. By remaining close to the current engine designs, materials of manufacture and manufacturing procedures of today allows this engine to be reproduced more readily and also makes it much easier for consumers to understand, maintain and operate by being nearly the same as the engines they are already familiar with.

The invention has been described in detail with particular reference to the embodiments thereof, but it will be understood that variations and modifications can be affected within the spirit and scope of the invention.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A system for facilitating conversion between reciprocating linear motion and rotational motion, comprising:
   a continuous undulating track defined by a first surface and a second surface opposing and spaced from the first surface, the track circumscribing a circular profile and generally defining a cylindrical volume having a central axis;
   a reciprocator configured to linearly reciprocate along the central axis;
   a converter positioned at least partially within the cylindrical volume, coupled to the reciprocator to linearly reciprocate with the reciprocator, and configured to rotate about the central axis, the converter including:
   a first roller engaged with the first surface of the undulating track; and
   a second roller engaged with the second surface of the undulating track; and
   a rotator positioned at least partially within the cylindrical volume, engaged with the converter, and configured to rotate about the central axis;
   wherein the reciprocator forces the converter to linearly reciprocate when the reciprocator is caused to linearly reciprocate along the central axis so that the first and second rollers roll along the undulating track thereby forcing the converter to rotate, in turn forcing the rotator to rotate; or
   wherein the rotator forces the converter to rotate when the rotator is caused to rotate about the central axis so that the first and second rollers roll along the undulating track so that the converter linearly reciprocates thereby forcing the reciprocator to linearly reciprocate.

2. The system of claim 1, wherein the first and second rollers are in rolling contact with each other.

3. The system of claim 1, wherein the converter further includes:
   a third roller engaged with the first surface of the undulating track; and
   a fourth roller engaged with the second surface of the undulating track.

4. The system of claim 3, wherein the first and second rollers are in rolling contact with each other and the third and fourth rollers are in rolling contact with each other.

5. The system of claim 1,
   wherein the rotator includes a linear track defined by a first surface and a second surface opposing and spaced from the first surface; and
   wherein the converter further includes:
   a third roller engaged with the first surface of the linear track; and
   a fourth roller engaged with the second surface of the linear track.

6. The system claim 5, wherein the third and fourth rollers are in rolling contact with each other.

7. The system of claim 5,
   wherein the rotator includes a second linear track defined by a first surface and a second surface opposing and spaced from the first surface; and
   wherein the converter further includes:
   a fifth roller engaged with the first surface of the second linear track; and
   a sixth roller engaged with the second surface of the second linear track.

8. The system of claim 7, wherein the third and fourth rollers are in rolling contact with each other and the fifth and sixth rollers are in rolling contact with each other.

9. The system of claim 7, wherein the converter further includes:
   a seventh roller engaged with the first surface of the undulating track; and
   an eighth roller engaged with the second surface of the undulating track.

10. The system of claim 9, wherein the first and second rollers are in rolling contact with each other, the third and fourth rollers are in rolling contact with each other, the fifth and sixth rollers are in rolling contact with each other, and the seventh and eighth rollers are in rolling contact with each other.

11. The system of claim 1, wherein the converter is coupled to the reciprocator so that the converter can rotate relative to the reciprocator.

12. A system for facilitating conversion between reciprocating linear motion and rotational motion, comprising:
   a continuous undulating track circumscribing a circular profile and generally defining a cylindrical volume having a central axis;
   a reciprocator configured to linearly reciprocate along the central axis;
   a converter positioned at least partially within the cylindrical volume, coupled to the reciprocator to linearly reciprocate with the reciprocator, engaged with the undulating track, and configured to rotate about the central axis; and
   a rotator positioned at least partially within the cylindrical volume, engaged with the converter, and configured to rotate about the central axis, wherein the rotator is generally cylindrical and includes a first passage through which the reciprocator extends and a second passage through which the converter extends;
   wherein when the reciprocator is caused to linearly reciprocate along the central axis, the reciprocator forces the converter to linearly reciprocate so that the converter rides along the undulating track thereby forcing the converter to rotate, in turn forcing the rotator to rotate; or
   wherein when the rotator is caused to rotate about the central axis, the rotator forces the converter to rotate so that the converter linearly reciprocates thereby forcing the reciprocator to linearly reciprocate.

13. The system of claim 12,
   wherein the undulating track is defined by a first surface and a second surface opposing and spaced from the first surface; and
   wherein the converter includes:
   a first roller engaged with the first surface of the undulating track; and
   a second roller engaged with the second surface of the undulating track.

14. The system of claim 13, wherein the first and second rollers are in rolling contact with each other.

15. The system of claim 13, wherein the converter further includes:

a third roller engaged with the first surface of the undulating track; and a fourth roller engaged with the second surface of the undulating track.

16. The system of claim 15, wherein the first and second rollers are in rolling contact with each other and the third and fourth rollers are in rolling contact with each other.

17. The system of claim 15, wherein the second passage defines a linear track defined by a first surface and a second surface opposing and spaced from the first surface; and wherein the converter further includes:

a fifth roller engaged with the first surface of the linear track; and a sixth roller engaged with the second surface of the linear track.

18. The system of claim 17, wherein the rotator further includes a second linear track defined by a first surface and a second surface opposing and spaced from the first surface; and wherein the converter further includes:

a seventh roller engaged with the first surface of the second linear track; and an eighth roller engaged with the second surface of the second linear track.

19. The system of claim 18, wherein the first and second rollers are in rolling contact with each other, the third and fourth rollers are in rolling contact with each other, the fifth and sixth rollers are in rolling contact with each other, and the seventh and eighth rollers are in rolling contact with each other.

20. The system of claim 12, wherein the second passage defines a linear track defined by a first surface and a second surface opposing and spaced from the first surface; and wherein the converter includes:

a first roller engaged with the first surface of the linear track; and a second roller engaged with the second surface of the linear track.

21. The system of claim 20, wherein the first and second rollers are in rolling contact with each other.

22. The system of claim 20, wherein the rotator further includes a second linear track defined by a first surface and a second surface spaced from the first surface; and wherein the converter further includes:

a third roller engaged with the first surface of the second linear track; and a fourth roller engaged with the second surface of the second linear track.

23. The system of claim 22, wherein the first and second rollers are in rolling contact with each other and the third and fourth rollers are in rolling contact with each other.

24. The system of claim 12, wherein the converter is coupled to the reciprocator so that the converter can rotate relative to the reciprocator.

25. A system for facilitating conversion between reciprocating linear motion and rotational motion, comprising:

a continuous undulating track circumscribing a circular profile and generally defining a cylindrical volume having a central axis;

a reciprocator configured to linearly reciprocate along the central axis;

a converter positioned at least partially within the cylindrical volume, coupled to the reciprocator to linearly reciprocate with the reciprocator, and engaged with the undulating track, the converter including a first roller and a second roller; and a rotator positioned at least partially within the cylindrical volume and configured to rotate about the central axis, the rotator including a linear track defined by a first surface and a second surface opposing and spaced from the first surface, wherein the first surface is engaged with the first roller and the second surface is engaged with the second roller;

wherein when the reciprocator is caused to linearly reciprocate along the central axis, the reciprocator forces the converter to linearly reciprocate thereby forcing converter to ride along the undulating track thereby forcing the converter to rotate and the first and second rollers to roll along the linear track, in turn forcing the rotator to rotate; or wherein when the rotator is caused to rotate about the central axis, the rotator forces the first and second rollers to roll along the linear track thereby forcing the converter to rotate and ride along the undulating track thereby forcing the converter linearly reciprocates, in turn forcing the reciprocator to linearly reciprocate.

26. A system for facilitating conversion between reciprocating linear motion and rotational motion, comprising:

a continuous undulating track defined by a first surface and a second surface opposing and spaced from the first surface, the track circumscribing a circular profile and generally defining a cylindrical volume having a central axis;

a reciprocator configured to linearly reciprocate along the central axis;

a converter positioned at least partially within the cylindrical volume, coupled to the reciprocator to linearly reciprocate with the reciprocator, and configured to rotate about the central axis, the converter including:

a first roller engaged with the first surface of the undulating track;

a second roller engaged with the second surface of the undulating track;

a third roller; and a fourth roller; and a rotator positioned at least partially within the cylindrical volume, engaged with the converter, and configured to rotate about the central axis, wherein the rotator is generally cylindrical and includes:

a passage through which the reciprocator extends; and a linear track defined by a first surface and a second surface opposing and spaced from the first surface, wherein the first surface of the linear track is engaged with the third roller and the second surface of the linear track is engaged with fourth roller;

wherein when the reciprocator is caused to linearly reciprocate along the central axis, the reciprocator forces the converter to linearly reciprocate so that the third and fourth roller roll along and linear track and the first and second rollers roll along the undulating track thereby forcing the converter to rotate, in turn forcing the rotator to rotate; or wherein when the rotator is caused to rotate about the central axis, the rotator forces the third and fourth rollers to roll along the linear track and the first and second rollers to roll along the undulating track so that the converter linearly reciprocates thereby forcing the reciprocator to linearly reciprocate.

27. A system for facilitating conversion between reciprocating linear motion and rotational motion, comprising:

a reciprocator that is configured to linearly reciprocate along a first axis;
a converter coupled to the reciprocator and configured to linearly reciprocate along the first axis and to rotate about the first axis;
a first rotating element coupled to the converter and configured to rotate about the first axis; and
a second rotating element coupled to the first rotating element and configured to rotate about a second axis that is transverse to the first axis.

28. The system of claim 27, wherein the second axis is perpendicular to the first axis.

29. The system of claim 27, further comprising:

a continuous undulating track circumscribing a circular profile and generally defining a cylindrical volume having a central axis that is coaxial to the first axis;
wherein the converter is engaged with the track to linearly reciprocate with the reciprocator by riding along the track, forcing the converter to rotate, and wherein rotation of the converter causes the converter to ride along the track to linearly reciprocate.

30. The system of claim 29, wherein the second axis is perpendicular to the first axis.

* * * * *